United States Patent
Nguyen

(10) Patent No.: US 11,421,726 B2
(45) Date of Patent: Aug. 23, 2022

(54) PANEL JOINER SYSTEMS AND METHODS

(71) Applicant: Nhon Hoa Nguyen, Bankstown (AU)

(72) Inventor: Nhon Hoa Nguyen, Bankstown (AU)

(*) Notice: Subject to any disclaimer, the term of this patent is extended or adjusted under 35 U.S.C. 154(b) by 0 days.

(21) Appl. No.: 17/133,700

(22) Filed: Dec. 24, 2020

(65) Prior Publication Data
US 2021/0190129 A1 Jun. 24, 2021

Related U.S. Application Data

(60) Provisional application No. 62/953,283, filed on Dec. 24, 2019.

(51) Int. Cl.
| | |
|---|---|
| *F16B 47/00* | (2006.01) |
| *B25B 11/00* | (2006.01) |
| *E04B 2/00* | (2006.01) |
| *B25J 15/06* | (2006.01) |
| *B25J 15/00* | (2006.01) |

(52) U.S. Cl.
CPC ............ *F16B 47/00* (2013.01); *B25B 11/005* (2013.01); *B25B 11/007* (2013.01); *B25J 15/0616* (2013.01); *E04C 2/44* (2013.01); *B25J 15/0004* (2013.01)

(58) Field of Classification Search
CPC ......... Y10T 29/53978; Y10T 29/49895; Y10T 29/49902; B27C 5/06; B25B 1/02; B25B 1/04; B25B 1/06; B25B 1/14; B25B 1/125; B25B 1/22; B25B 11/005; B25B 11/007; B27B 25/10; F16M 11/08; B25J 9/108; B25J 15/0616; B25J 15/0004; F16B 47/00; F16B 5/0008; F16B 47/006; F16B 11/006; E04C 2/44

USPC ............................. 269/21, 43; 29/281.5, 467
See application file for complete search history.

(56) References Cited

U.S. PATENT DOCUMENTS

| | | | | |
|---|---|---|---|---|
| 2,382,405 A * | 8/1945 | Eckman | ............... | B65H 3/0883 294/189 |
| 7,270,357 B1 * | 9/2007 | Liao | ......................... | B65G 7/12 294/15 |
| 7,310,865 B2 * | 12/2007 | Cole | ...................... | G02F 1/1339 29/281.5 |
| 9,649,695 B1 * | 5/2017 | Smith | ................ | B23B 29/03435 |
| 2003/0034601 A1 * | 2/2003 | Kloepfer | ................. | B25B 1/103 269/21 |

(Continued)

OTHER PUBLICATIONS

Ausabaco (Ausabaco Qli Seam Setter With Suction Cups Published on Oct. 22, 2019 at https://www.youtube.com/watch?v=ui4NqG5jm7k (Year: 2019).*

(Continued)

*Primary Examiner* — Mahdi H Nejad
(74) *Attorney, Agent, or Firm* — Tue Nguyen

(57) ABSTRACT

A panel joiner system includes 2 sets of suction cups couple together through a linear guide to allow the sets of suction cups to move toward each other for joining panels along the edges. A movement mechanism is also coupled to the suction cups to convert a rotational movement to a linear movement of the suction cups. A surface alignment module is coupled to the linear guide to move between the suction cups for aligning the top surface of the panels. Compressible materials or ball bearings can be disposed between the section cups and the linear guide to allow the panel joiner to adjust the panel positions for joining.

19 Claims, 27 Drawing Sheets

(56) References Cited

U.S. PATENT DOCUMENTS

2003/0094773 A1\* 5/2003 Lerner .................. B25B 11/005
279/3
2018/0250811 A1\* 9/2018 Wagner ................... B25J 17/02

OTHER PUBLICATIONS

Ausavina (Ausavina Easy Work Seam Setter with Battery; Published on Mar. 24, 2019 at Ausavina Easy Work Seam Setter with Battery—YouTube (Year: 2019).\*
Abaco (The Abaco Ratchet Seam Setter—Demo; Published on Mar. 15, 2013 at The Abaco Ratchet Seam Setter—Demo—YouTube (Year: 2013).\*
Abaco2019 (Abaco Qli Seam Setter 4 x 5" Suction Cups #AQSSW4x5, Published on Oct. 3, 2019 at Abaco Qli Seam Setter 4 x 5" Suction Cups #AQSSW4x5 on Vimeo (Year: 2019).\*
Omni Cubed Pro Overview: Stealth Seamer™ found at: https://www.youtube.com/watch?v=xuSSZ9gQVKM (Year: 2017).\*
NCCTEC (Stone Seam Setter—NCCTEC ASS61) found at: https://www.youtube.com/watch?v=4JsrKeBGxgQ (Year: 2013).\*

\* cited by examiner

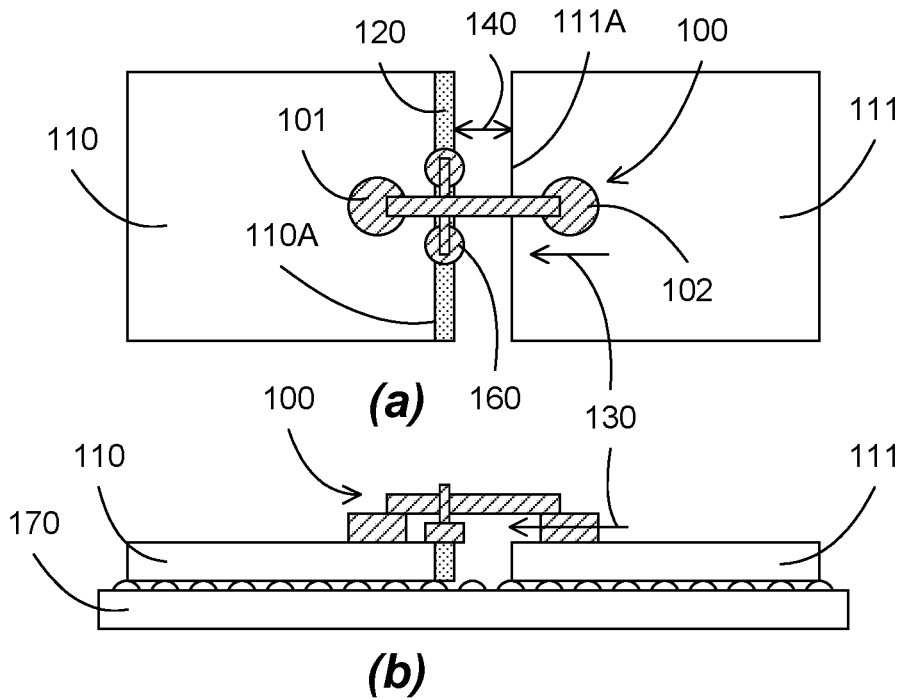
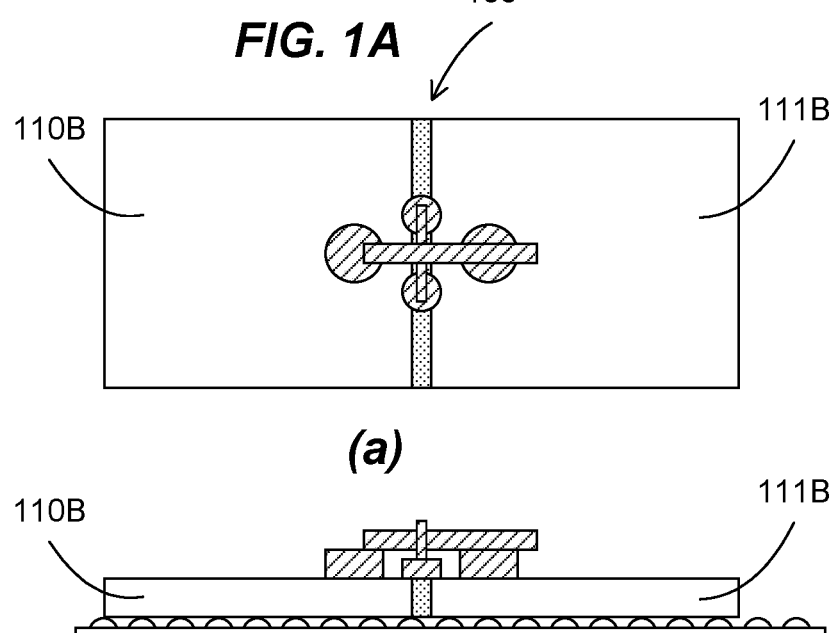
FIG. 1A
FIG. 1B

Forming a panel joiner, wherein the panel joiner is configured to be removably coupled to two adjacent panels, wherein the panel joiner comprises a moving mechanism configured to align the two panels for a seamless joint.
200

FIG. 2A

Placing two panels adjacent to each other.
220

↓

Placing a panel joiner on the two panels.
230

↓

Activating a coupling mechanism to couple the panel joiner to the two panels.
240

↓

Activating a first moving mechanism to align the two panels in a lateral direction.
250

↓

Activating a second moving mechanism to align the two panels in a vertical direction.
260

FIG. 2B

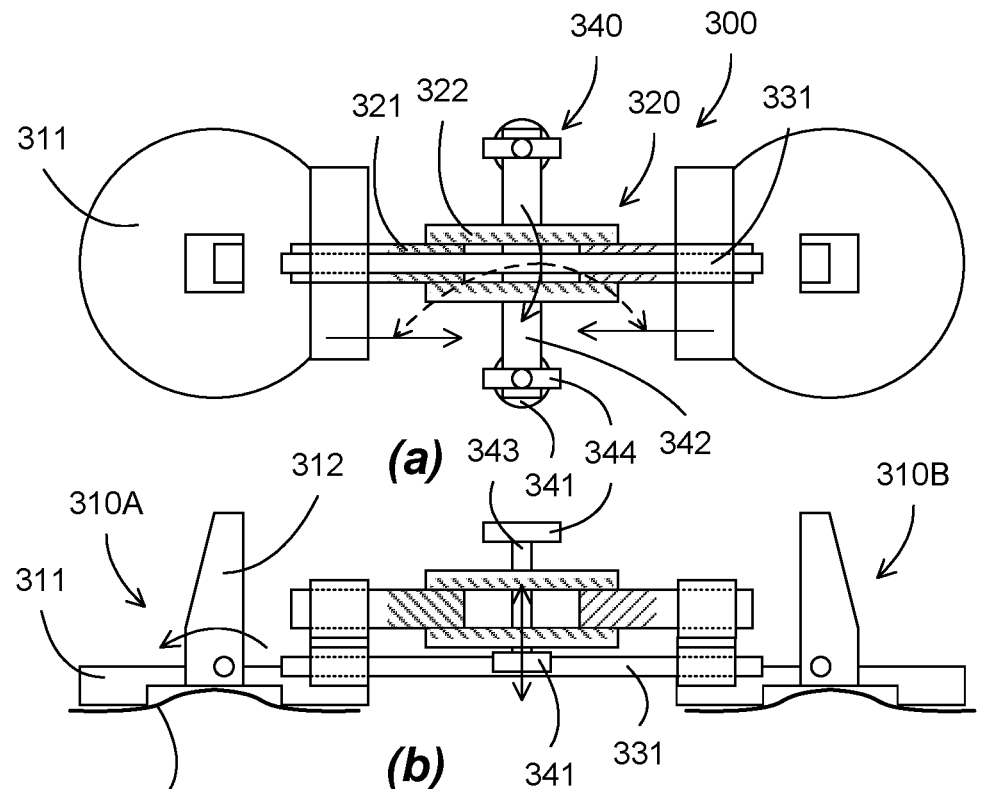
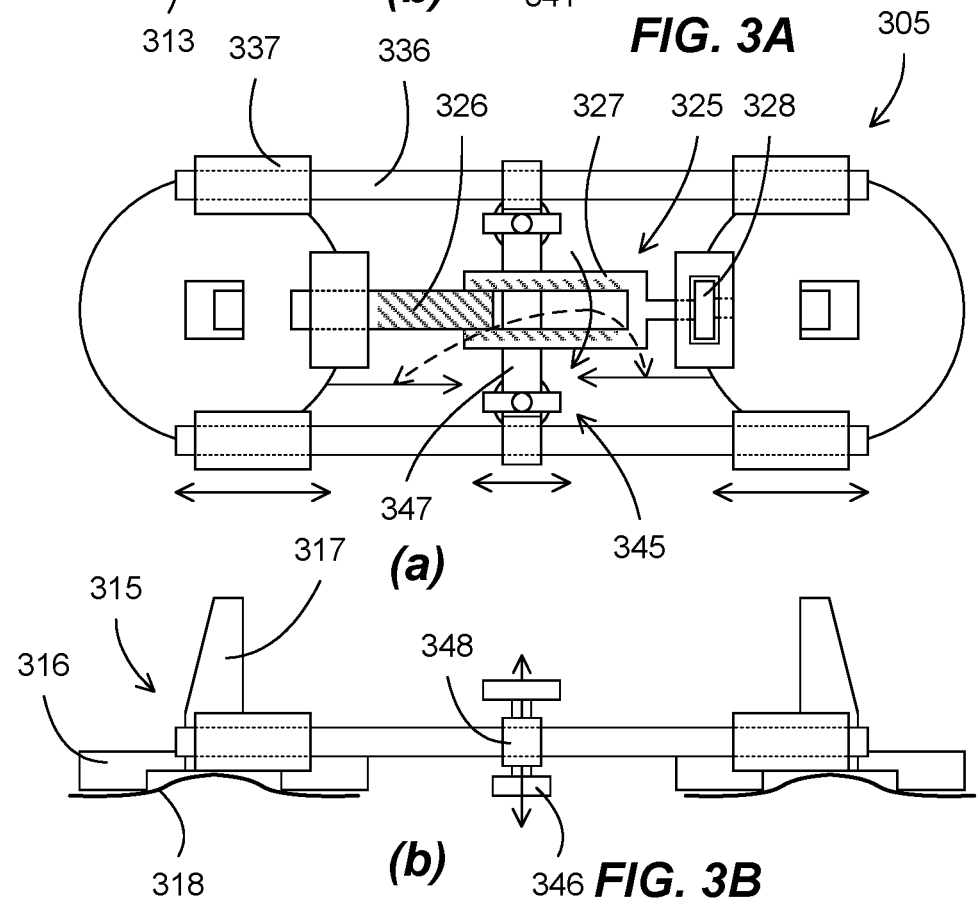
FIG. 3A
FIG. 3B

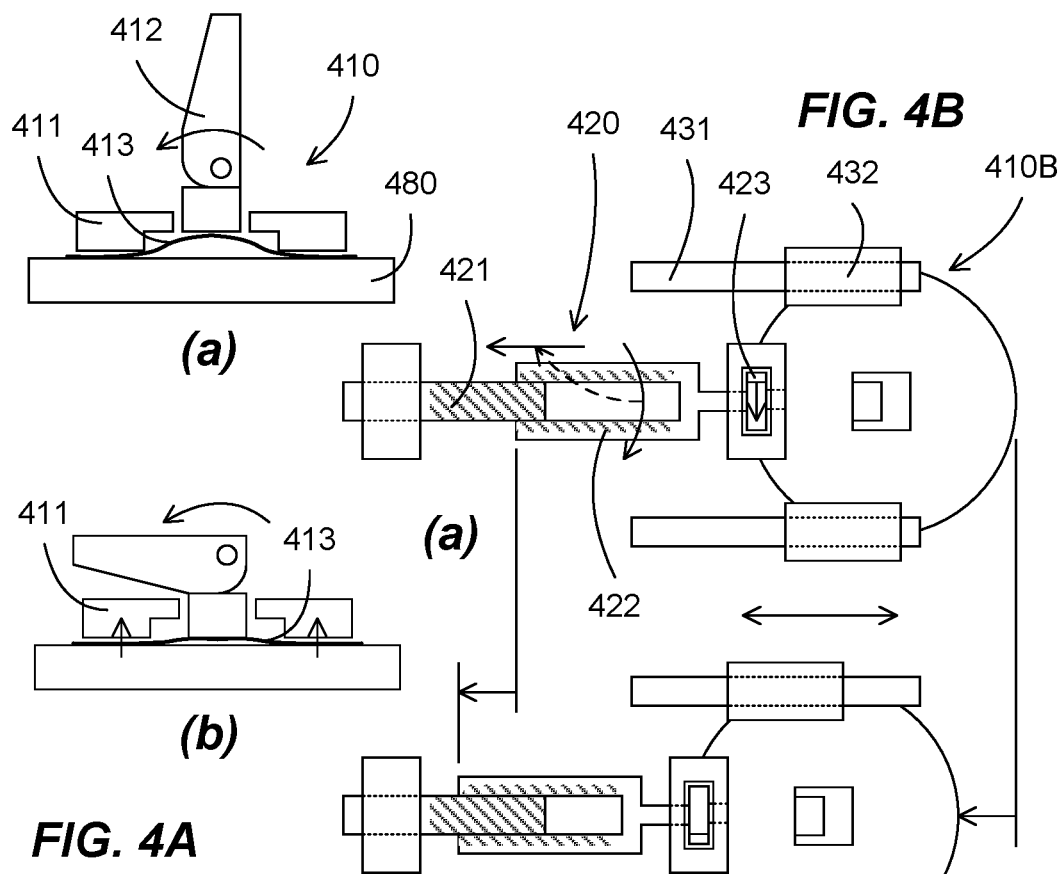
FIG. 4A
FIG. 4B
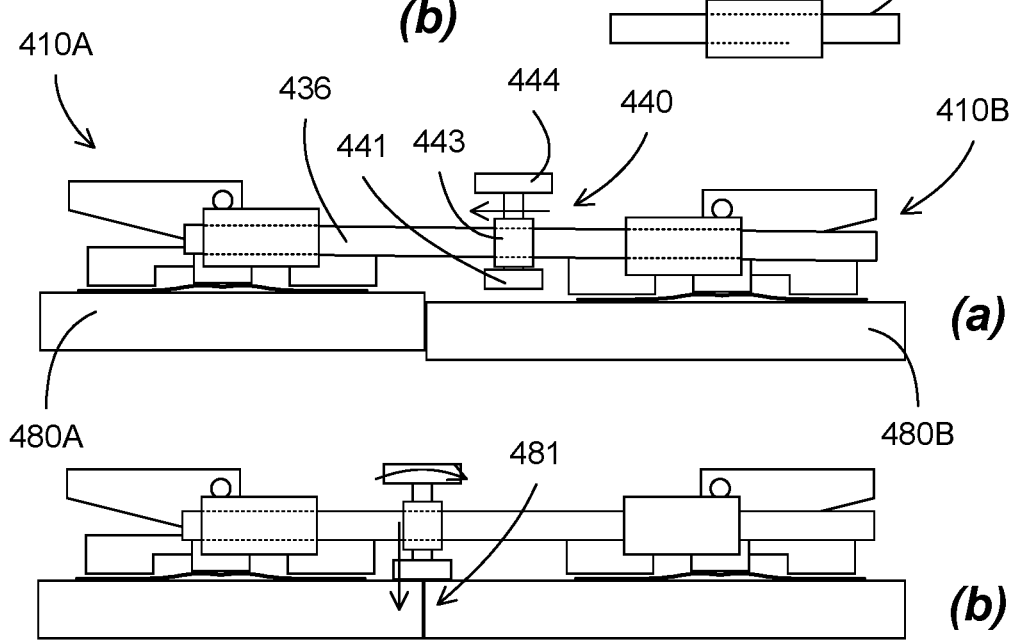
FIG. 4C

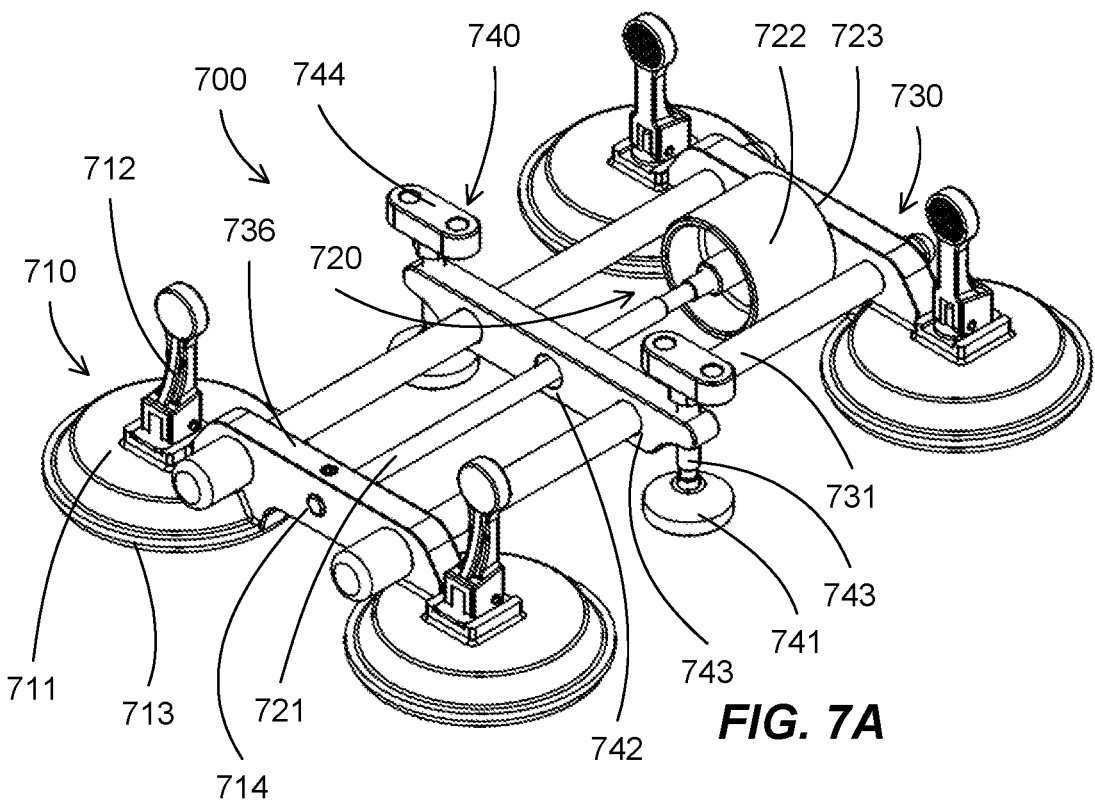
FIG. 7A
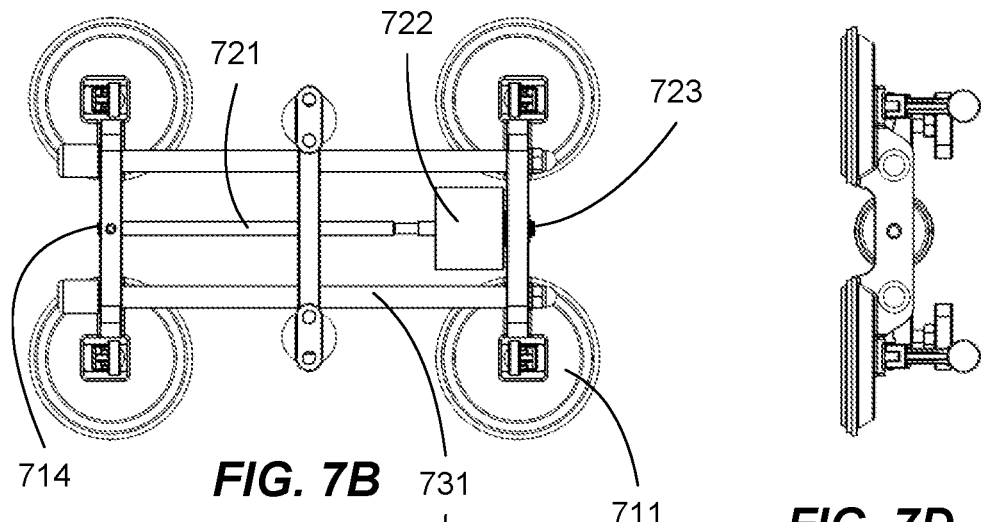
FIG. 7B
FIG. 7D
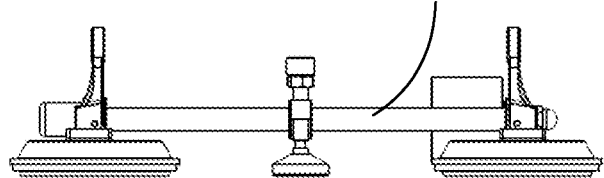
FIG. 7C

Forming a panel joiner, wherein the panel joiner comprises two suction cups, wherein the panel joiner comprises a first moving mechanism coupled to a linear guide joining the two suction cups, wherein the first moving mechanism is configured to move the suction cups in a first lateral direction toward or away from each other, wherein the panel joiner comprises a second moving mechanism coupled to the linear guide, wherein the second moving mechanism is configured to move the suction cups in a second vertical direction perpendicular to the first lateral direction.
800

*FIG. 8A*

Forming a panel joiner,
wherein the panel joiner comprises two suction cups, wherein the panel joiner comprises a first moving mechanism joining the two suction cups, wherein the first moving mechanism comprises two bars at two opposite sides of the suction cups to form a linear guide to guide the movements of the suction cups, wherein the first moving mechanism comprises a threaded rod having one end coupled to a first suction cup, wherein the first moving mechanism comprises a mating nut rod having one end coupled to a second suction cup, wherein the threaded rod and the mating nut rod are coupled to move the suction cups toward or away from each other in a first lateral direction along the linear guide when the threaded rod or the mating nut rod rotates, wherein the panel joiner comprises a second moving mechanism coupled to the linear guide to move along the linear guide, wherein the second moving mechanism comprises a soft pad movable in a second vertical direction perpendicular to the first lateral direction for pressing on a surface interface of the panels
820

*FIG. 8B*

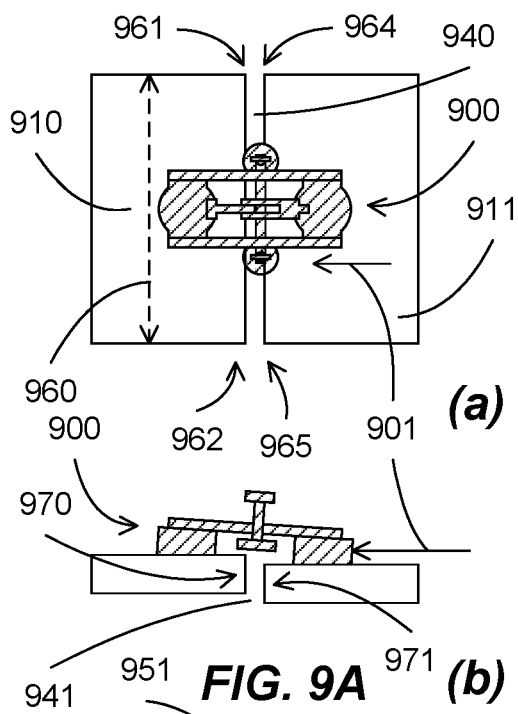
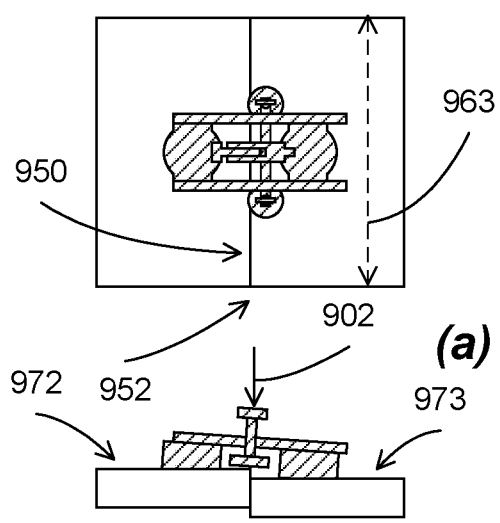
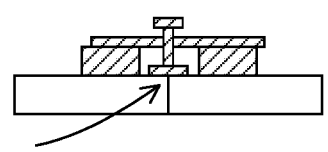
*FIG. 9A*  *FIG. 9B*  *FIG. 9C*
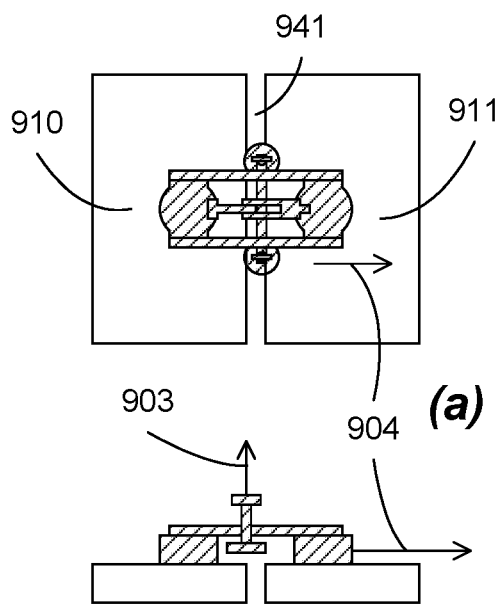
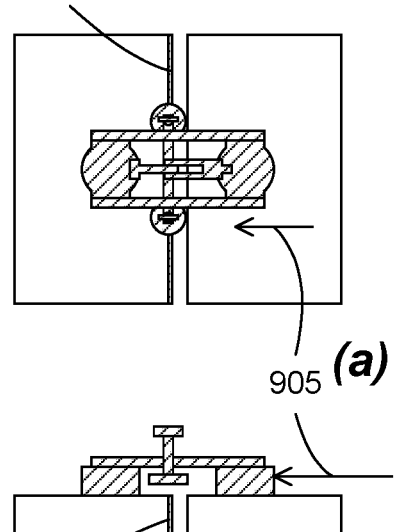
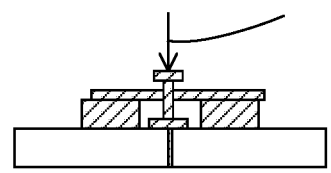
*FIG. 9D*  *FIG. 9E*  *FIG. 9F*

Placing a first and a second panels spaced apart from each other.
1000

Placing a panel joiner on the two panels, wherein a first suction cup of the panel joiner is disposed on a surface of the first panel, wherein a second suction cup of the panel joiner is disposed on a surface of the second panel,
1010

Activating the suction cups so that the suction cups adhere to the first and second panels.
1020

Rotating a nut rod or a threaded rod of the panel joiner to move the first and second panels to contact each other along a linear guide of the panel joiner.
1030

Moving a soft pad feet assembly along the linear guide so that the soft pad is disposed on a contact interface of the first and second panels.
1040

Adjusting a position of the soft pad to align the surfaces of the first and second panels.
1050

*FIG. 10*

Forming a panel joiner, wherein the panel joiner comprises two suction cups and a moving mechanism coupled to the two suction cups for moving the two suction cups relative to each other,
Wherein the panel joiner comprises a compressible material between a suction cup of the two suction cups and the moving mechanism, wherein the compressible material is configured to allow relative rotational and linear movements of the suction cup
1500

FIG. 15A

Coupling a compressible material between a suction cup and a moving mechanism of a panel joiner, wherein the compressible material comprises a dimension sufficient to allow the suction cup to move a distance relative to the moving mechanism, wherein the distance is less than 5 mm
1520

FIG. 15B

Coupling a compressible material between a suction cup and a moving mechanism of a panel joiner, wherein the suction cup further comprises a handle to assist in moving the suction cup relative to the moving mechanism
1540

FIG. 15C

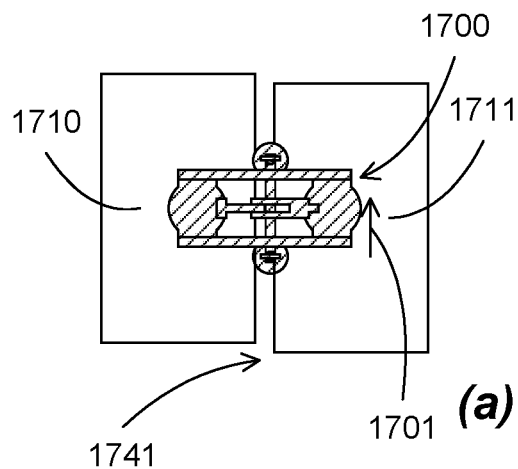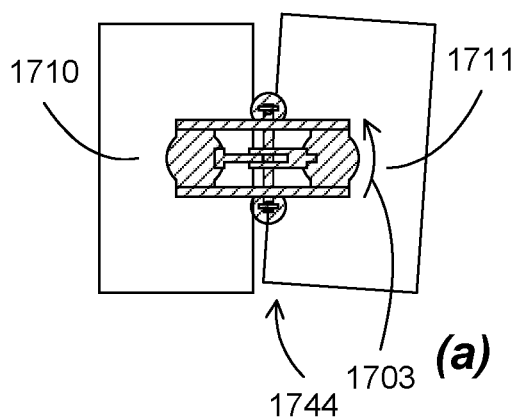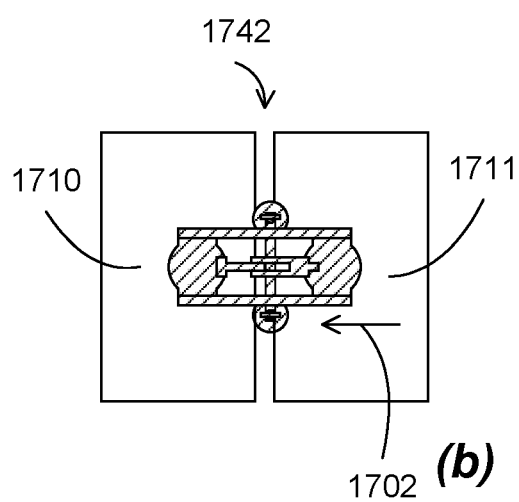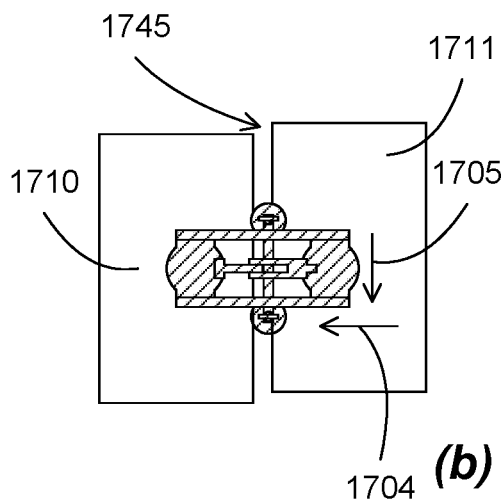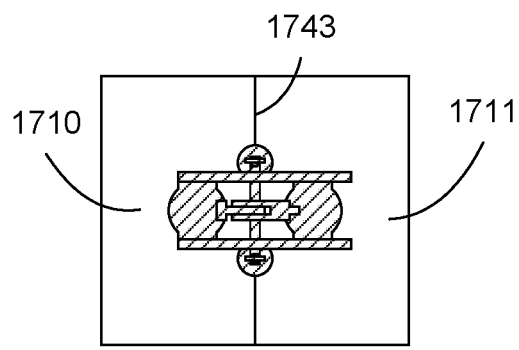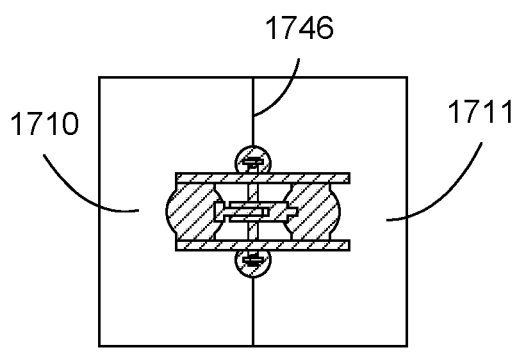
FIG. 17A  FIG. 17B

Coupling a compressible material around a suction cup of a panel joiner, wherein the compressible material comprises a dimension sufficient to allow the suction cup to move a distance relative to a moving mechanism of the panel joiner.
1800

*FIG. 18A*

Moving two suction cups toward each other to narrow a gap between two panels on which the two suction cups are adhered to, while linearly and rotationally adjusting positions of at least one suction cup to align the edges of the two panels.
1820

*FIG. 18B*

Placing a panel joiner on two panels, so that a first suction cup is adhered to a first panel and a second suction cup is adhered to a second panel, wherein the first panel is disposed at a distance from the second panel.
1840

Activating a moving mechanism on the panel joiner to move the two suctions cups toward each other in a first direction.
1850

Rotating and/or moving, in a direction different from the first direction, the first panel to align the two panels.
1860

*FIG. 18C*

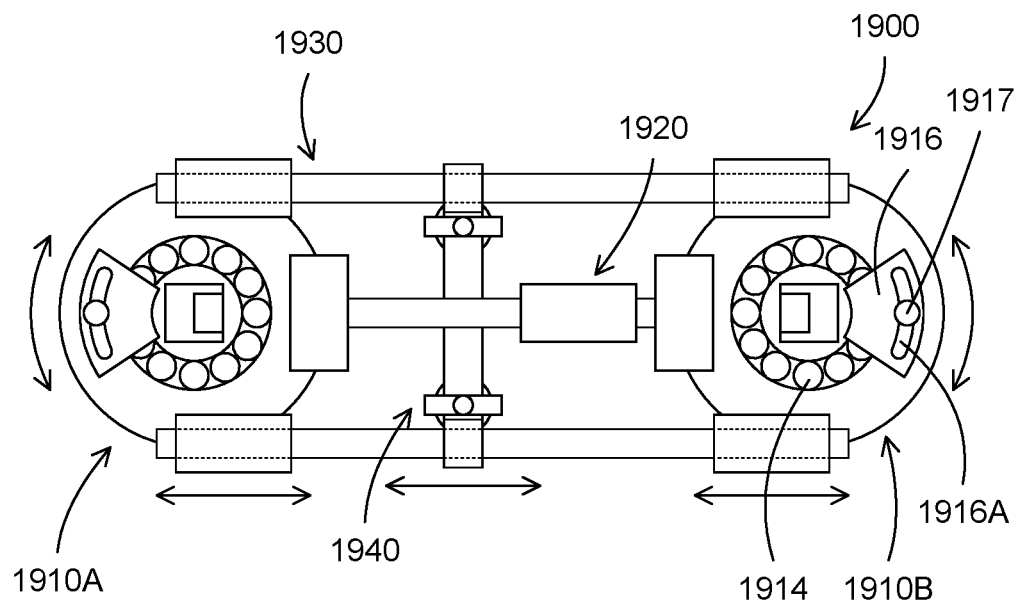
FIG. 19A
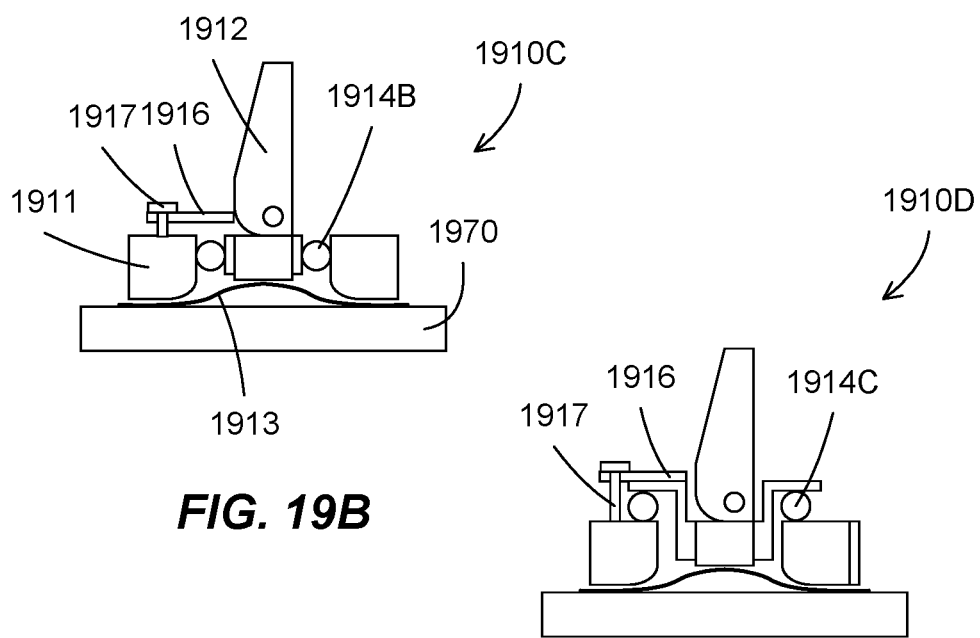
FIG. 19B
FIG. 19C

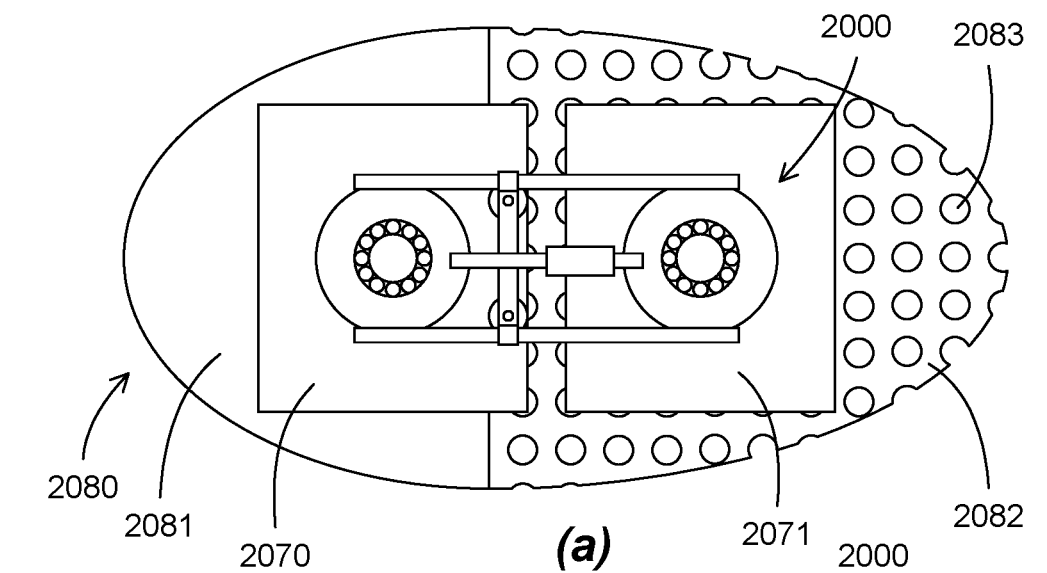
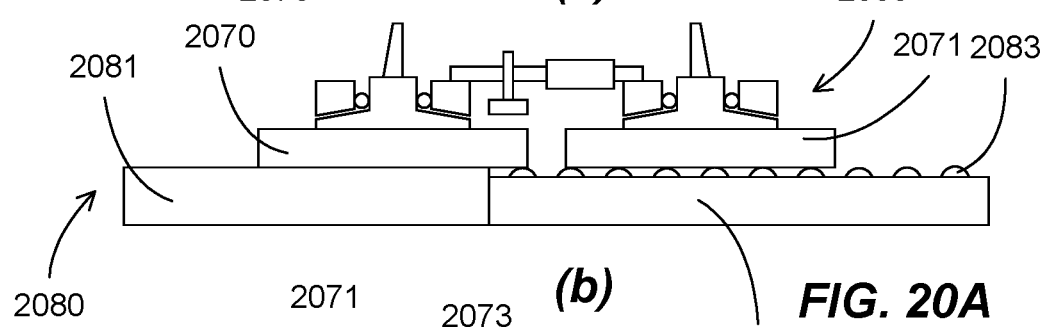
FIG. 20A
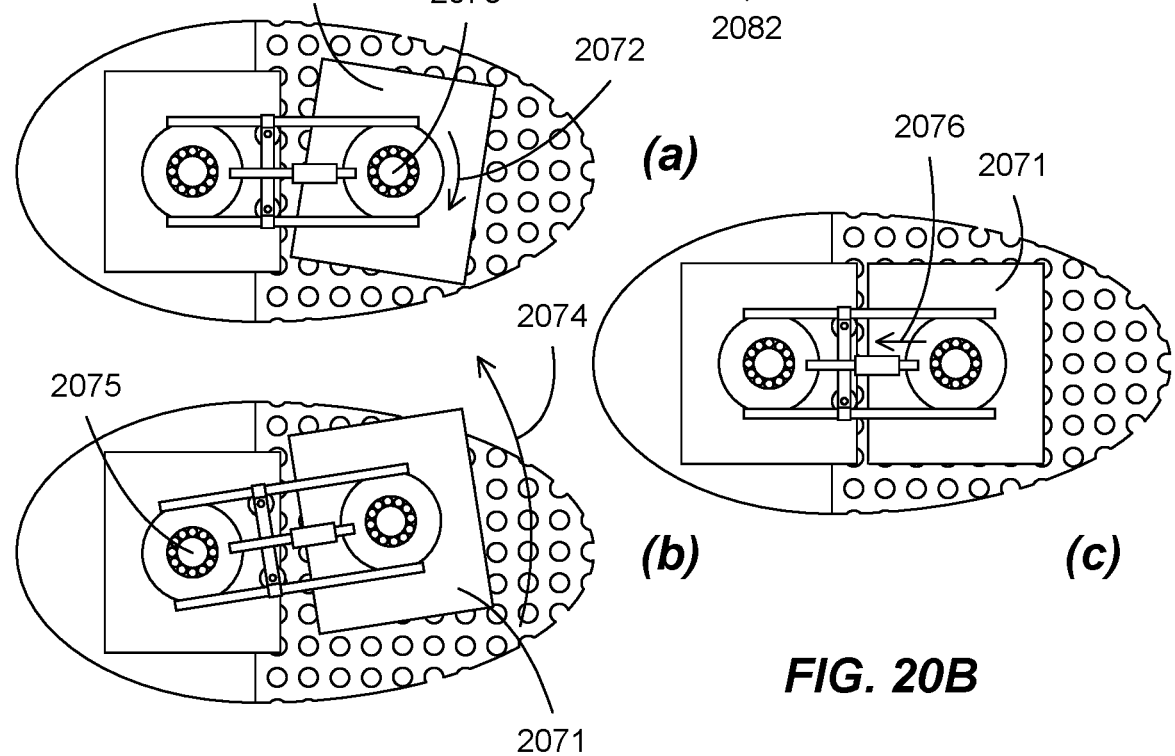
FIG. 20B

Forming a panel joiner, wherein the panel joiner comprises two suction cups and a moving mechanism coupled to the two suction cups for moving the two suction cups relative to each other,
Wherein each suction cup is coupled to the panel joiner through a ball bearing to allow the suction cup to rotate relative to a body of the panel joiner, wherein the suction cup and the body are further coupled through a securable element to prevent the rotation.
2100

*FIG. 21A*

Coupling a ball bearing between each suction cup and a body of a panel joiner, wherein the panel joiner comprises a secure element to secure and limit the rotational movement of the suction cup relative to the body.
2120

*FIG. 21B*

Disposing a first panel on a flat surface and a second on a roller ball surface, wherein the roller ball surface is configured to reduce friction between the second panel and the roller ball surface for ease of movement.
2140

Placing a panel joiner on the first and second panels.
2150

Activating a mechanism to move the second panel toward the first panel, when rotating the second panel around rotational axes at the centers of a first suction cup and a second suction cup of the panel joiner.
2160

*FIG. 21C*

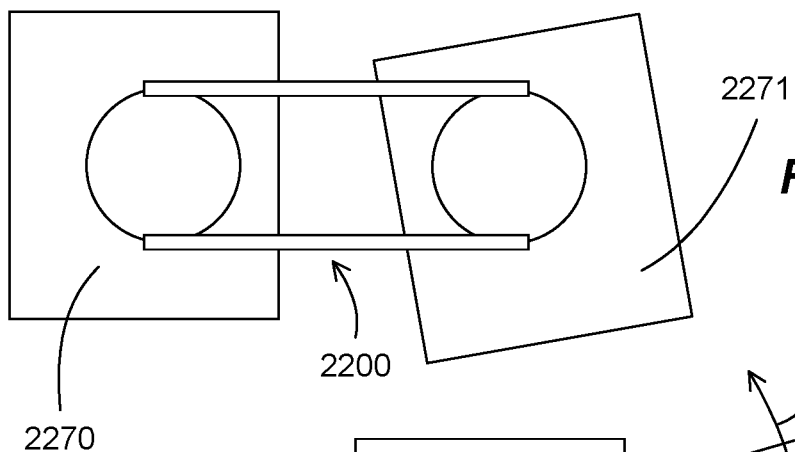
FIG. 22A
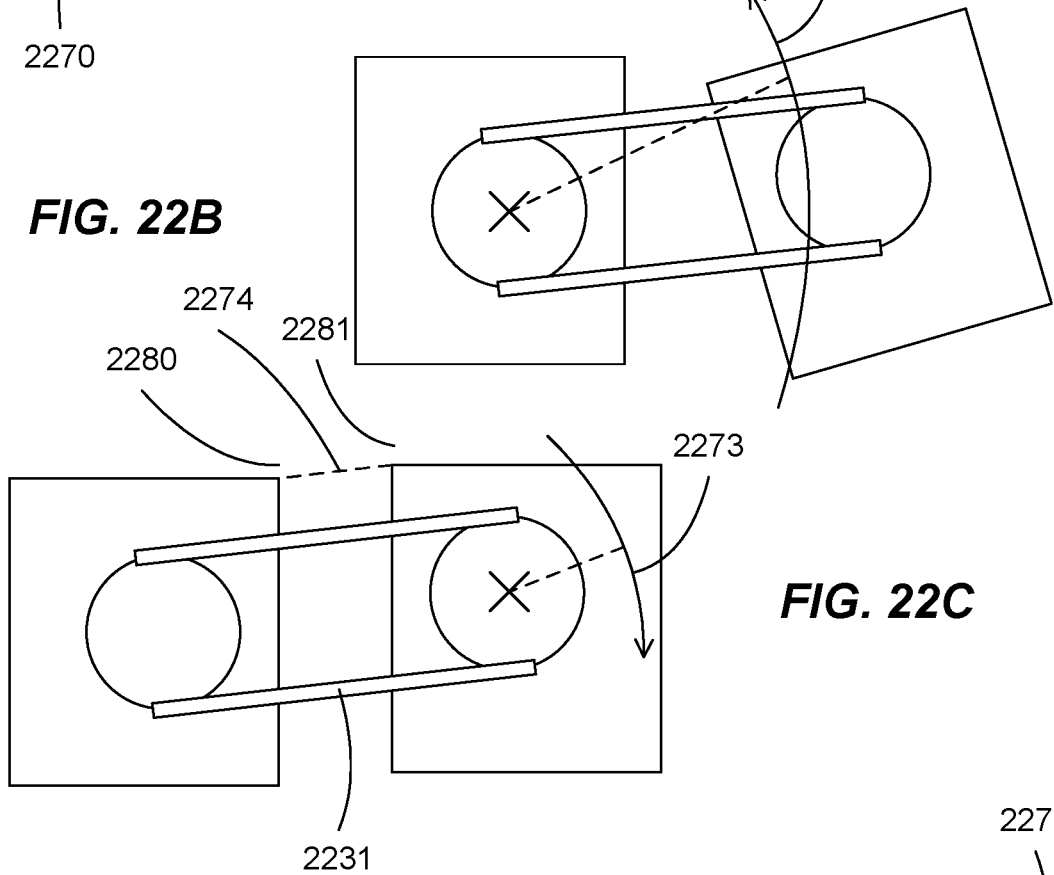
FIG. 22B
FIG. 22C
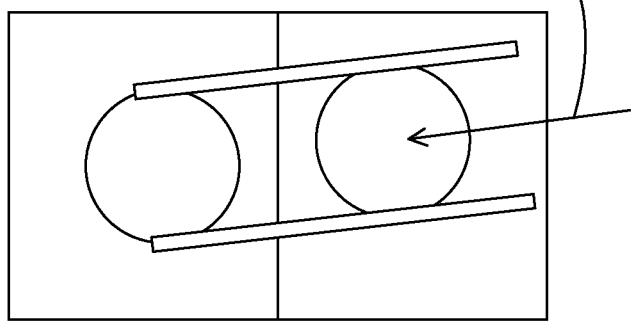
FIG. 22D

Placing a panel joiner on a first and second panels, wherein a first suction cup of the panel joiner is disposed on the first panel and a second suction cup of the panel joiner is disposed on the second panel.
2300

Rotating the second panel around a center of the first suction cup
2310

Rotating the second panel around a center of the second suction cup, wherein the second rotation forms parallel edges of the first and second panels.
2320

Moving the second panel toward the first panel, wherein the first and second rotations cause the top corners of the panels parallel to the movement.
2330

*FIG. 23A*

Placing a panel joiner on a first and second panels, wherein first and second suction cups of the panel joiner are disposed on the first and second panels, respectively.
2350

Incrementally moving the second panel toward the first panel, rotating the second panel around a center of the first suction cup, and rotating the second panel around a center of the second suction cup to align the two panels
2360

*FIG. 23B*

PANEL JOINER SYSTEMS AND METHODS

The present patent application claims priority from U.S. Provisional Patent Applicant Ser. No. 62/953,283, filed on Dec. 24, 2019, entitled "Panel joiner systems and methods", of the same inventors, hereby incorporated by reference in its entirety.

BACKGROUND OF THE INVENTION

Countertops made of solid thick panels, such as wood or granite, have become quite popular in kitchens, bathrooms, and offices. The growing popularity of these materials is due to the material having the qualities of high durability, ease of cleaning and sterilization, and beauty. Another aspect of panel countertops is the appearance of a single and continuous countertop even when it is fabricated from many adhesively bonded sections. The joining of smaller panels can provide a cost effective solution for making large panels.

An important criterion of the joining process of small panels is that the panels need to be accurately positioned relative to each other. This can be difficult and time consuming to achieve. Registered side edges can be formed on the sides of the panels to be adhesively joined, which can simplify the alignment process for the joined panels. This can also add to the cost of panel fabrication.

The panels can be clamped to hold the panels together during the joining process. The clamping can be important to achieve a properly aligned joint, such as a smooth and continuous finished joint. The clamping can damage the panel surfaces, such as by marring or leaving marks on the finished panels.

Thus, there is a need for panel joiner systems that are low cost, are easily to use, and do not damage the finished surfaces.

SUMMARY OF THE EMBODIMENTS

In some embodiments, the present invention discloses a panel joiner system for joining flat substrates, such as panels, along the edges of the substrates. The panel joiner system can provide fine adjustments of the joining of the panels to achieve an aesthetic looking interface, such as a seamless connection with continuous and smooth transitions between the joined panels. The panel joiner can have a lateral moving mechanism for moving the panels toward each other to provide a continuous interface, e.g., without any gaps between the panels. The panel joiner can have a perpendicular moving mechanism for aligning the top surfaces of the panels to provide a smooth interface, e.g., without any steps between the panels. The panel joiner can further have a displacement or a rotational mechanism for fine adjustments of the panels, such as aligning along the panel edges or aligning at corners of the panels.

In some embodiments, the present invention discloses a panel joiner for joining two panels using two sets of suction cups, with the suction cups configured to be coupled to top surfaces of the two panels by vacuum suction. A set of suction cups can include one or two suction cups, for coupling to a panel.

The panel joiner can include a linear guide coupled to the sets of suction cups such that at least a set of suction cups is movable along a direction of the linear guide. For example, a first set of suction cup is coupled to the linear guide with a bearing, such as a bushing bearing or a ball bearing, for ease of moving along the linear guide. A second set of suction cups can be fixedly coupled to one end of the linear guide. Thus, the first set of suction cups can move along the linear guide toward or away from the fixed set of suction cups. The linear guide can include one or more guides, e.g., linear guide shafts, such as one or more rods or rails configured to allow a bushing, a roller, a linear bearing, or a carriage can smoothly travel along the guides.

In some embodiments, each set of suction cups can include one suction cup, and the linear guide can include two parallel guides. The suction cup is then coupled to the two parallel guides at two opposite sides of the suction cup.

In some embodiments, each set of suction cups can include two suction cups, and the linear guide can include two parallel guides. The two suction cups are then coupled to the two parallel guides at two facing sides of the two suction cups. For example, the two parallel guides can be disposed between two suction cups, such as a left suction cup is coupled to a left guide, which is coupled to a right guide, which is then coupled to a right suction cup. The two parallel guides can be disposed outside the two suction cups, such as a left guide is coupled to a left suction cup, which is coupled to a right suction cup, which is then coupled to a right guide.

The panel joiner can include a moving mechanism configured to move the sets of suction cups toward or away from each other. For example, the moving mechanism can be coupled to the two sets of suction cups, such as fixedly coupled to the set of suction cups that is fixedly coupled to the linear guide, and movably coupled to the set of suction cups that is movably coupled to the linear guide. In this configuration, the moving mechanism can move the movably set of suction cups along the linear guide toward or away from the other set of suction cups. In some embodiments, the moving mechanism can be fixedly coupled to both sets of suction cups, and have a rotatable element, such as a turnbuckle, to move the two sets of suction cups toward or away from each other. In some embodiments, the movement mechanism is configured to convert a rotational movement to a linear movement, such as using a lead screw, a ball screw or a turnbuckle. The conversion can provide fine movements, for example, based on the pitches of the lead screw, ball screw, or turnbuckle. For example, a full rotation of the moving mechanism can be converted to a few millimeters or less, such as less than or equal to 5 mm, less than or equal to 3 mm, less than or equal to 2 mm, or less than or equal to 3 mm.

The panel joiner can include a surface alignment module, which is configured to align surfaces of the two panels to generate a smooth transition from one panel to the other panel, such as to minimize a step between the top surfaces of the two panels. The surface alignment module can include one or more flat elements having a flat bottom surface facing the top surfaces for aligning the top surfaces. The flat elements is movably coupled to a body portion of the surface alignment module, for example, to be movable along a direction perpendicular to the top surfaces for pressing on the top surfaces at one or more joint locations between the two panels. The surface alignment module is movably coupled to the linear guide to move along the linear guide, for example, so that the flat bottom surface of the flat elements are pressing on an interface area between the two panels. In operation, after the moving mechanism brings the two panels together, the surface alignment module can move along the linear guide to be positioned at or near or generally around the interface area. The flat elements can move downward so that the flat bottom surfaces contact both top surfaces of the panels, pressing on the protruded panel until the two panels are aligned in the vertical direction.

In some embodiments, the surface alignment module can include one or more connector elements movably coupled to the linear guide for moving along the direction of the linear guide, with each connector elements of the one or more connector elements having at least one flat element of the one or more flat elements, with the at least one flat element configured to move along the direction perpendicular to the top surfaces. For example, the surface alignment module can include one connector element coupled to two guides of a linear guide, with two flat elements coupled to two ends of the connector element. The connector element can move along the guides of the linear guide, to position the flat elements above the interface of the panels. The surface alignment module can include one connector element coupled to two guides of a linear guide, with two flat elements coupled to each of the two ends of the connector element. The surface alignment module can include two connector elements, with each connector element coupled to a guide of a linear guide, with one or two flat elements coupled to each of the two connector elements. In some embodiments, the surface alignment module further comprises a locking element to secure the one or more connector elements to the linear guide.

In some embodiments, the panel joiner can include a compressible material, coupled between a set of suction cups and the linear guide. The compressible material can be configured to provide displacement movements, e.g., small movements in lateral directions (directions parallel to the top surfaces of the panels), in order to provide minor alignment for the panels.

For example, a panel joiner can include two suction cups, e.g., each set of suction cups has one suction cup, coupled to two guides at two opposite ends of the suction cup. A compressible material can be disposed between the suction cup and the two guides, for example, in a form of a rubber ring surrounding and separating a flexible membrane of the suction cup. The rubber ring can be coupled to a support coupled to the flexible membrane. The rubber ring can also be couple to a support, such as the body of the suction cup, which is coupled to the linear guide. The rubber ring can deform somewhat, which can allow the flexible membrane to have a lateral displacement relative to the linear guide. Since the flexible membrane is coupled to a panel, the panel can move relative to the other panel, which is coupled to the other suction cup, which is coupled to the linear guide.

A compressible material can be disposed between the suction cup and the two guides, for example, in a form of a rubber sleeve surrounding the guides of the linear guide. The sleeve can be coupled to the guides that are connected to the movable suction cup, or can be coupled to the guides that are connected to the fixed suction cup. The rubber sleeve can deform somewhat, which can allow the suction cup, which is coupled to the guides through the rubber sleeve, to have a lateral displacement relative to the linear guide. Since the suction cup is coupled to a panel, the panel can move relative to the other panel, which is coupled to the other suction cup, which is coupled to the linear guide.

In some embodiments, the panel joiner can include a securing element coupled between the set of suction cups and the linear guide to prevent displacements of the set of suction cups relative to the linear guide. The securing element can be configured to disable the effects of the compressible material, such as to fixedly couple the two components joined through the compressible material. For example, if the compressible material is a rubber right surrounding a flexible membrane of a suction cup, the securing element can fixedly couple two components across the compressible material to prevent the movement of the compressible material.

In some embodiments, the panel joiner can include one or more bearings, such a bushings (or sometimes called bushing bearings), rotational bearing, or thrust bearings, coupled between one or two sets of suction cups and the linear guide. The bearings can be configured to provide rotational movements, e.g., rotational movements for each set of suction cup around each axis of rotations perpendicular to the top surfaces of the panels, in order to provide alignment for the panels.

For example, a panel joiner can include two suction cups, e.g., each set of suction cups has one suction cup, coupled to a linear disposed guide between the two suction cups. A bearing can be disposed between each suction cup and the linear guide, for example, in a form of a circle surrounding and separating a flexible membrane of the suction cup. The bearing can be coupled to a support coupled to the flexible membrane. The bearing can also be couple to a support, such as the body of the suction cup, which is coupled to the linear guide. The flexible membrane can rotate relative to the linear guide. Since the flexible membrane is coupled to a panel, the panel can rotate relative to the other panel, which is coupled to the other suction cup, which is coupled to the linear guide.

In some embodiments, the panel joiner can include a limiter coupled between the suction cup and the linear guide to limit rotational movements of the suction cup relative to the linear guide. For example, the limiter can restrict the suction cup to rotate less than 90 degrees, less than 60 degrees, less than 45 degrees, or less than 30 degrees.

In some embodiments, the panel joiner can include a securing element coupled between the suction cup and the linear guide to prevent rotational movements of the suction cup relative to the linear guide.

In some embodiments, the panel joiner can include a restrictor coupled between the suction cup and the linear guide to increase friction to rotational movements of the suction cup relative to the linear guide. The restrictor can allow the suction cups to rotate, but with a high torque, e.g., a torque that a worker can place on the suction cup, instead of a freely rotating suction cup, that can rotate at a slightest torque.

In some embodiments, the panel joiner can be motorized, e.g., including a vacuum pump coupled to the suction cups to generate suction, e.g., vacuum, for the sets of suction cups. The panel joiner can include a motor coupled to the moving mechanism to move the movable set of suction cups toward or away from the other set of suction cups.

BRIEF DESCRIPTION OF THE DRAWINGS

FIGS. 1A-1E illustrate a process for joining two panels according to some embodiments.

FIGS. 2A-2B illustrate processes for forming and using a panel joiner according to some embodiments.

FIGS. 3A-3B illustrate configurations for a panel joiner according to some embodiments.

FIGS. 4A-4C illustrate components of a panel joiner according to some embodiments.

FIGS. 7A-7D illustrate a perspective view, a top view and two side views of another panel joiner according to some embodiments.

FIGS. 8A-8B illustrate flowcharts for forming panel joiners according to some embodiments.

FIGS. 9A-9F illustrate a process to join two panels using a panel joiner according to some embodiments.

FIG. 10 illustrates a flowchart to join panels according to some embodiments

FIGS. 15A-15C illustrate flowcharts for forming panel joiner having a compressible material according to some embodiments.

FIGS. 17A-17C illustrate processes for joining panels using a panel joiner having a minor adjustment mechanism according to some embodiments.

FIGS. 18A-18C illustrate flowcharts for aligning panels using a panel joiner according to some embodiments.

FIGS. 19A-19C illustrate a panel joiner having rotational mechanisms for according to some embodiments.

FIGS. 20A-20B illustrate configurations and operations of a support table according to some embodiments.

FIGS. 21A-21C illustrate flowcharts for forming and operating a panel joiner according to some embodiments.

FIGS. 22A-22D illustrate a sequence of movements of a panel joiner for aligning panels according to some embodiments.

FIGS. 23A-23B illustrate flowcharts for aligning panels according to some embodiments.

DETAILED DESCRIPTION OF THE EMBODIMENTS

Figure 1C:
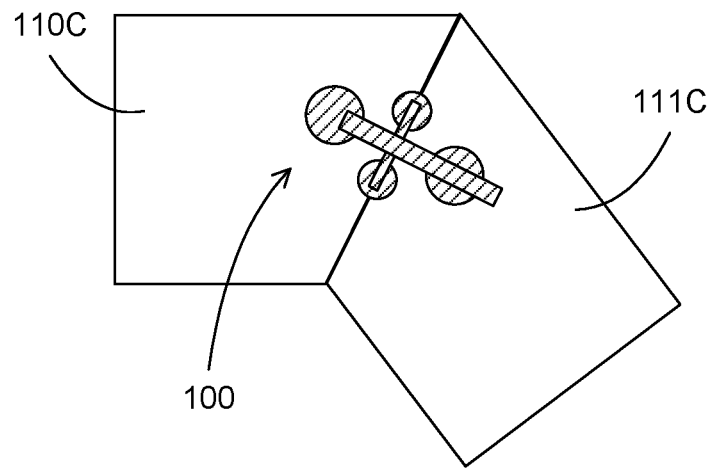

In some embodiments, the present invention discloses a panel joiner system for joining edges of panels, boards, or generally flat substrates. The panels can be joined in a same plane, such as mutually abutting edge surfaces to form a larger panel. The panel joiner system can provide fine adjustments of the joining of the panels to achieve an aesthetic looking interface, such as a seamless connection with continuous and smooth transitions between the joined panels.

In some embodiments, the present invention discloses a panel joiner system and methods for use thereof, which can facilitate the joining of two panels of a work surface equipment, such as a countertop or other shelving constructions. The panel joiner system can allow joining two sections either at the site of manufacture or at the site of installation.

The panel joiner system can join flat panels having square edges or mitered joints, such as forming face-to-face edge joining along the edge surfaces of the flat panels. The joined panels can have a neat appearance and is secure, with one continuous and smooth seam. The panel joiner system can provide a unique edge joining process providing a seamless one-piece appearance in an easy-to-performed process. The panel joiner system can be configured to allow inexperienced workers to perform the job with no specialty tools, thus can be widely adaptable due to its low cost process.

In joining panels together, an adhesive can be used at the joining edge surfaces. A panel joiner system can be used to secure the panels until the adhesive is dried and the panels are bonded. The panel joiner system can provide panel adjustments, e.g., adjusting the position of one panel with respect to the other panel in order to provide a cosmetic joining interface, such as an invisible interface.

For example, two panels that are to be joined together can be placed next to each other on a support, such as on a table top. The table top can include flat surface, a roller ball surface having multiple ball transfer bearing units arranged to form a ball transfer surface, or a combination of a flat surface and a roller ball surface. A first panel can be placed on the flat surface, or can be partially on the flat surface and partially on the roller ball surface. The second panel can be placed on the roller ball surface, e.g., the second panel can be easily moved in a lateral direction parallel to the roller ball surface.

A panel joiner system can include two suction cups, which can be connected together through a moving mechanism configured to move the suction cups toward and away from each other. The suction cups can be configured to be secured to the panels, such as a first suction cup is disposed on a first panel and a second suction cups is disposed on a second panels. Vacuum suction can secure the suction cups to the panels, for example, using a manual handle or a vacuum pump. The suction cups can have a soft surface, such as a rubber or soft plastic material, to prevent damaging the contact areas of the suction cups with the panels.

The panel joiner system can include moving mechanisms to adjust the position of one panel with respect to the other panel, e.g., changing relative positions of the panels, such as moving the second panel on the roller ball surface of the support table while the first board is stationary on the flat surface of the support table. The position adjustments can include fine adjustment mechanisms so that the interface at the joint can appear to be seamless, e.g., providing an aesthetic looking interface with no gaps and no steps. For example, the fine adjustment mechanisms can include a conversion mechanism from a rotational movement to a linear movement, such as using a ball screw, a lead screw, or a threaded rod rotating against a mated nut rod.

The panel joiner system can include a moving mechanism coupled to the suction cups to move the suction cups in a direction connecting the suction cups. The moving mechanism can include a linear guide linking the suction cups, such as one or two smooth rods. The suction cups can have a mating bearing with the smooth rods, and thus can move along the smooth rods. The bearing can be a sleeve bearing, e.g., a bushing, or a linear ball bearing.

The moving mechanism can include a movable coupling that can adjust a distance between two components. For example, the moving mechanism can include a lead screw or ball screw, with the lead screw shaft coupled to a suction cup, and the mating nut coupled to another suction cup. When the lead screw shaft rotates relative to the mating nut, the mating nut can move along the lead screw shaft, thus moving the suction cups toward or away from each other.

The moving mechanism can include threaded rods, or partially threaded rods having one threaded end, with one end of the threaded rods, or the unthreaded end of the partially threaded rods, coupled to the suction cups. A turnbuckle can be disposed between the threaded rods, and threaded to the threaded rods. The threads of the threaded rods can be in opposite directions, e.g., one clockwise and one counterclockwise. Thus, when the turnbuckle rotates in one direction, the threaded rods can enter the turnbuckle, which shortens the length of the threaded rods and which brings the suction cups toward each other. When the turnbuckle rotates in an opposite direction, the threaded rods can leave the turnbuckle, which lengthens the length of the threaded rods and which moves the suction cups away from each other.

The moving mechanism can include a threaded rod, or a partially threaded rod having one threaded end, with one end of the threaded rod, or the unthreaded end of the partially threaded rod, coupled to a suction cup. A long mating nut, such as a mating nut rod having an inside thread mated with the outside thread of the threaded rod, can be coupled to the threaded end of the threaded rod, e.g., the mating nut can be screwed into the threaded rod. The other end of the mating nut can be rotatably coupled to the other suction cup, for example, through a rod with one end bonded to the mating nut and an opposite end coupled to the suction cup.

When the mating nut rotates, the mating nut can enter or leave the threaded rod, bringing the two suction cups together or moving the two suction cups away from each other.

The moving mechanism can be configured to align the edge surfaces of the panels, e.g., the edge surface of one panel is moved, by the moving mechanism, to be parallelly touching the edge surface of another panel. The two edge surfaces are aligned with no gaps, which can provide a continuous interface between the two edge surfaces.

The panel joiner system can include a second moving mechanism coupled to the linear guide of the first moving mechanism. For example, the second moving mechanism can include a vertical aligned bar (or rod or flat thin elongated plate) having a bearing (sleeve bearing or linear ball bearing) at the ends. The bearing can be coupled to the smooth rods, such as the bearing is configured to slide in the smooth rods. The second moving mechanism, including the vertical aligned bar, is disposed between the two suction cups. Thus the second moving mechanism can move along the linear guide, to be closer to either suction cup.

The second moving mechanism can further include one or two rotatable feet coupled to the vertical aligned bar. For example, each rotatable foot of the rotatable feet can have a flat foot, such as a swivel foot having a flat bottom surface, coupled to a foot rod, such as a threaded rod. The foot rod can be screwed to the vertical aligned bar, e.g., the vertical aligned bar can have inside thread mated with the thread of the foot rod. The rotatable foot can have a handle coupled to the foot rod to rotate the foot rod, e.g., when the handle rotates in one direction, the foot rod rotates against the vertical aligned bar, and lifting the flat foot of the rotatable foot away from the surface of the panels. When the handle rotates in an opposite direction, the foot rod rotates against the vertical aligned bar, and moving the flat foot toward the surface of the panels.

The flat foot, e.g., the flat portion of the rotatable foot, can include a soft material, such as a rubber or a soft plastic, to prevent damage to the panel surface when the rotatable foot rests on the panel surface.

The second moving mechanism can be configured to align the top surfaces of the panels, e.g., the top surface of one panel is moved, by the second moving mechanism using the flat portion of the rotatable feet to push on the top surface at the interface of the two panels, to be at a same lateral plane as the other top surface of the other panel. The two top surfaces are aligned with no steps, which can provide a smooth interface between the two top surfaces.

In operation, the rotatable feet are rotated up, so that the flat feet are away from the top surface of the panels. After the side edge surfaces of the panels are aligned, for example, by moving the panels toward each other, the vertical aligned bar is moved along the linear guide so that the rotatable feet are disposed on the interface, e.g., at the location that one side edge surface of one panel touches the other side edge surface of the other panel. The rotatable feet are rotated down, so that the feet are moving toward and contact the top surfaces of the panels. The rotatable feet can continue to be rotated down, until the two surfaces are on a same lateral plane.

The panel joiner system can form adjoining pieces in a work surface equipment, e.g., an equipment having a working surface, such as joining smaller panels to form a larger panel, which can be used in countertops, backsplash in countertops, and any work surface equipment. The panel joiner system can be used to form a work surface equipment that includes a work space surface, such as a furniture like a table, a countertop, a bench, or a desk. The equipment can include a large substantially horizontal surface panel used as a work space. The panel joiner system thus can provide a cost effective solution for large working surfaces, for example, by joining smaller panels together.

The panel joiner system can be used to join panels without registration marks and still offer a strong and virtually imperceptible finished seam. For example, the panels can be cut at a square angle, forming panels with perpendicular edge surfaces. The panel can be cut any angle, such as 45 degrees. It is not necessary to perform other cutting or preparation of the panels. The panels can be placed on a support surface, and a worker can place a panel joiner system on the panel surfaces. The worker then can adjust the moving mechanisms of the panel joiner system to achieve a desired joint between the panels. The panel joiner system can keep the panels in place until the adhesive is set. Afterwards, the panel joiner system can be removed from the joined panels.

The panel joiner system can allow tryout or testing for the joining of the panels, e.g., without the use of the adhesive. The panel joiner system can also allow ease of repeating the operation. Thus, once a fit is determined to be satisfactory, the panel joiner system can be partially loosened, e.g., the moving mechanisms can be operated in reverse to separate the panels, and a coating of adhesive can be placed on the joint edges. The panel joiner system then can be re-set, setting again to achieve a seamless joint. Since the panel joiner system has been set before, the re-setting process can be fast, without or with only minor adjustment. After the adhesive is bonded, the panel joiner system can be removed.

FIGS. 1A-1E illustrate a process for joining two panels according to some embodiments. FIGS. 1A(a) and 1A(b) show a first step in which the panels are placed next to each other. FIG. 1A(a) shows a top view and FIG. 1A(b) shows a side view.

Panels 110 and 111 can be placed on a support surface 170, such as on a roller ball table to allow ease of moving. The panels can be prepared to be joined at the side edge surface 110A and 111A, respectively, for example, by cleaning to remove any debris, and by applying a layer 120 of an adhesive material. The side edge surfaces can be perpendicular to the lateral surface of the panels. The panels can be separated by a small distance 140. Pre-alignment process can be performed, by arranging the joined edge surfaces of the panels to be somewhat parallel with corner matching 150.

A panel joiner 100 can be placed on the panels, with one suction cup 101 disposed on a panel 110 and another suction cup 102 disposed on another panel 111. The suction cups can be activated to be adhered to the panels. Thus, the panels are linked together through the panel joiner 100. The top surface alignment 160 of the panel joiner is retracted to not touching the top surface of the panels.

A moving mechanism of the panel joiner can be activated to pull 130 the suction cups toward each other. Since the suction cups are adhered to the panels, the moving mechanism also pulls the panels together.

FIGS. 1B(a) and 1B(b) show a second step in which the panels are pulled together to form a larger joined panel. FIG. 1BA(a) shows a top view and FIG. 1B(b) shows a side view. The panels are moving toward each other until the two side edge surfaces 110A and 111A are touched. Minor adjustment can be made to ensure proper alignment, such as corner matching 150 and no gaps at the interface, e.g., between the side edge surfaces 110A and 111A.

The top surface alignment 160 of the panel joiner positioned at the interface, and then is extended to align the top surfaces of the panels. For example, the top surface alignment 160 can include rubber feet, which can press at the interface of the two panels, and which can level any step at the interface. The panel joiner can be kept in place until the adhesive material is set. Then the suction cups can be deactivated to remove the panel joiner from the joined panels.

Figure 1D:
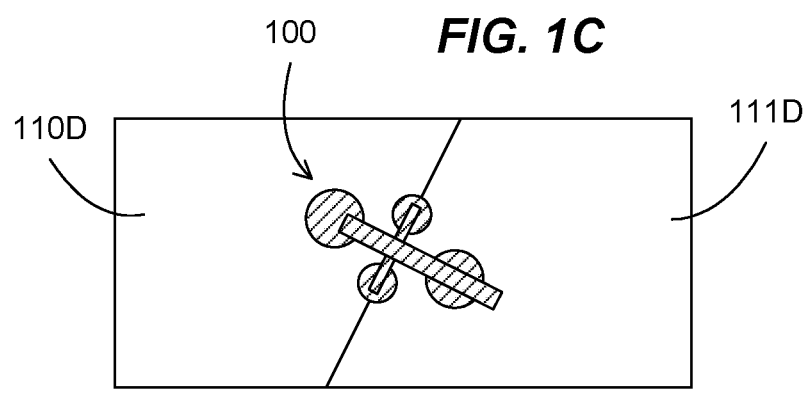
Figure 1E:
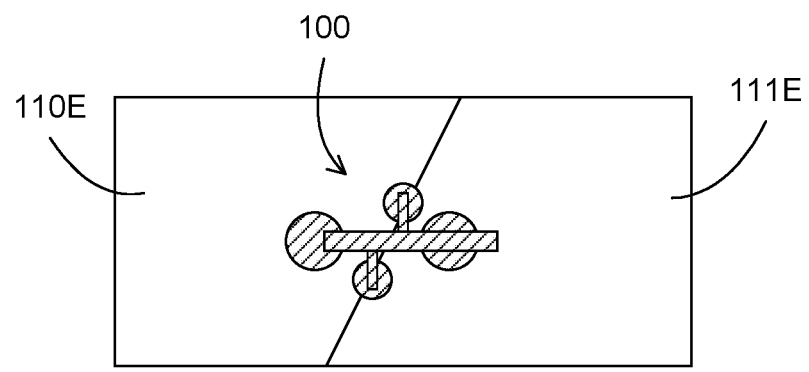

FIG. 1C shows a configuration in which the panel joiner 100 is used to join two panels 110C and 111C at an angle, with the panel joiner is disposed perpendicular to the interface or seam between the panels. FIG. 1D shows a configuration in which the panel joiner 100 is used to join two panels 110D and 111D at an angle cut, with the panel joiner is disposed perpendicular to the interface or seam between the panels. FIG. 1E shows a configuration in which the panel joiner 100 is used to join two panels 110E and 111E at an angle cut, with the panel joiner is disposed parallel to an edge of the panels, e.g., not perpendicular to the interface or seam between the panels.

FIGS. 2A-2B illustrate processes for forming and using a panel joiner according to some embodiments. In FIG. 2A, operation 200 forms a panel joiner. The panel joiner can be configured to be removably coupled to two adjacent panels, for example, through two suction cups each adhering to each panel through a soft material to prevent marring the panel surfaces. The panel joiner can include a moving mechanism configured to align the two panels to form a seamless joint, such as a continuous and smooth interface.

FIG. 2B shows a process for using a panel joiner. Operation 220 places two panels adjacent to each other, for example, on a support table, such as a roller ball table for ease of moving the panels. The panels can be pre-aligned, for example, by arranging so that the joined edge surfaces are parallel to each other with corner matching. The joined edge surfaces can be prepared, such as cleaned or coated with an adhesive layer.

Operation 230 places a panel joiner on the two panels. The panel joiner can be positioned so that it can be adhered to both panels. For example, the panel joiner can include two suction cups for attaching to the panel surface, and each suction cup can be disposed on each panel. The panel joiner can be prepared for operation, such as resetting the mechanisms, such as moving the suction cups apart, for example, farther than the separation of the two panels.

Operation 240 activates a coupling mechanism to couple the panel joiner to the two panels. For example, the suction cups can be pushed down against the top surfaces of the panels to activate the suction forces that attach the suction cups to the panels.

Operation 250 activates a first moving mechanism to align the two panels in a lateral direction. The first moving mechanism can be coupled to the suction cups to move the suction cups together, effectively moving the panels together. The first moving mechanism has been reset before using, meaning the suction cups can be moved farther apart so that the suction cups can travel toward each other at least the separation distance between the panels.

Operation 260 activates a second moving mechanism to align the two panels in a vertical direction. The second moving mechanism can include one or more feet configured to press on both panel top surfaces to align the top surfaces. The second moving mechanism has been reset before using, meaning the feet can be moved up until not touching the top surfaces. The second mechanism can be moved so that the feet are positioned above the joined interface, e.g., which can allow the feet to contact both panel top surfaces. The feet then can move down, to press on both top surfaces to align the top surfaces, such as to prevent steps at the joined interface.

In some embodiments, the present invention discloses a panel joiner, which can be used to join panels with cosmetic appearance at the joint, e.g., providing a continuous (e.g., no gaps) and smooth (e.g., no steps) at the interface between the panels.

The panel joiner can include two suction cups, or any other device that can removably and securely coupled to surfaces of the panels without marring or damaging the surfaces. The suction cups can include a flexible membrane, which is disposed in a body of the panel joiner, for example, a suction cup can be covered by a shell. A suction handle can be movably coupled to the shell. When the handle moves down, the membrane of the suction cup can be pressed toward the panel surface to form a vacuum suction. When the handle moves up, the suction cup can be pulled up to re-flex the flexible membrane of the suction cup to release the vacuum.

Each suction cups can be disposed on a panel, and then the suction cups can be activated to form a vacuum region between the suction cups and the surfaces of the panels. The vacuum region can securely couple the suction cups to the panels, thus can allow the panels to move by moving the suction cups.

The two suction cups can be connected together through a moving mechanism that can change a distance between the suction cups. The moving mechanism can align the panels along the side edge surfaces, e.g., intimately joining the two side edges surfaces of two opposite panels to form a seamless and invisible joint, such as a joint without any voids or gaps in between the panels. In operation, at the beginning, the two suction cups are well separated, for example, at a maximum separation. By bringing the suction cups together, the panels can also be brought together to form a seamless joint between the two panels.

The moving mechanism can include a rotational converter, which can convert a rotational movement into a linear movement to move the suction cups in the direction connecting the suction cups. The rotational converter can provide fine movements, to allow for adjustments of the panels to achieve an invisible seam at the joint. For example, the moving mechanism can include a lead screw or a ball screw having one end of the lead screw shaft coupled to one suction cup, and one end of the ball nut or the mating nut coupled to another suction cup. By rotating the ball nut relative to the lead screw shaft, the ball nut can move linearly along the lead screw shaft, bring the suction cups and the panels along. Other moving mechanism can be used, such as a turnbuckle, or a threaded rod with a mating nut rod.

The moving mechanism can include a linear guide to guide the movements of the suction cups, and the panels. For example, the linear guide can include one or two smooth rods, on which the suction cups are slidably coupled to. The body that houses the suction cups can include two portions, with each portion houses a suction cup. The portions each can include linear bearings, such as linear ball bearings or sleeve bearings that can be slide over the smooth rods. Thus the body portions can slide along the smooth rods through the linear bearings.

The panel joiner can include another mechanism for aligning the top surfaces of the panels, e.g., forming a smooth transition between the top surface of one panel to the top surface of the joined panel, such as a joint without any steps when moving from one panel to the next panel. The top surface alignment mechanism can include one or more feet with a soft material at the bottom of the feet, to prevent marring or damaging to the top surfaces of the panels.

In operation, the feet can be pushed on both surfaces of the panels, such as at the joint of the panels. The pushing of the feet can flatten the two panels, e.g., smoothing out any steps between the panels.

FIGS. 3A-3B illustrate configurations for a panel joiner according to some embodiments. FIGS. 3A(a) and 3A(b) show a configuration in which there is one smooth rod 331 functioning as a linear guide between two suction cups 310A and 310B. FIG. 3A(a) shows a top view and FIG. 3A(b) shows a side view of the panel joiner.

A panel joiner 300 can include two suction cup assemblies 310A and 310B, with each suction cup assembly including a flexible membrane 313 functioning as a suction cup, which is housed in a body 311. A handle 312 can be movably coupled to the body 311 for pushing or for releasing the suction cup membrane 313. When the suction cup membrane is pushed down, air in the cavity of the suction cup membrane is pushed out, forming a vacuum suction between the suction cup membrane and the panel surface on which the suction cup assembly is disposed on.

The two suction cup assemblies 310A and 310B can be coupled together through a moving mechanism 320. In this configuration, the moving mechanism 320 can include two threaded rods 321 (the threaded rods 321 can be partially threaded as shown), with one end of the threaded rods 321 coupled to the suction cup assemblies 310A and 310B. The threaded rods 321 can have opposite threading directions, such as one threaded rod having clockwise threads and the other having counterclockwise threads. The moving mechanism 320 can include a turnbuckle 322, which is threaded to the threaded rods 321. When the turnbuckle 322 rotates, the turnbuckle is threaded into or away from the threaded rods 321, which can move the suction cup assemblies toward or away from each other.

The moving mechanism 320 can include a linear guide in the form of a smooth rod 331, which can function as directional guidance for the movements of the suction cup assemblies.

The panel joiner 300 can include a top surface alignment mechanism 340, which can push on the top surfaces of both panels at the joined interface to align the two top surfaces. The mechanism 340 can include an alignment bar 342, which can be coupled to the linear guide 331 to move along the linear guide between the two suction cup assemblies. At the ends of the alignment bar 342, there can be two alignment feet assemblies, with each alignment feet assembly including a foot 341, which is coupled to a threaded rod 343, which is coupled to a handle 344. The threaded rod 343 is threaded to the alignment bar 342, so that when the handle 344 rotates, the threaded rod 343 rotates against the alignment bar 342, and pushing to or pulling the foot 341 away from the top surfaces of the panels.

FIGS. 3B(a) and 3B(b) show a configuration in which there are two smooth rods 336 functioning as a linear guide between two suction cups 315. FIG. 3B(a) shows a top view and FIG. 3B(b) shows a side view of the panel joiner.

A panel joiner 305 can include two suction cup assemblies 315, with each suction cup assembly including a flexible membrane 318 functioning as a suction cup, which is housed in a body 316. A handle 317 can be movably coupled to the body 316 for pushing or for releasing the suction cup membrane 318.

The two suction cup assemblies 315 can be coupled together through a moving mechanism 325. In this configuration, the moving mechanism 325 can include a threaded rod 326 (the threaded rods 326 can be partially threaded as shown), with one end of the threaded rod 326 coupled to a suction cup assembly. The moving mechanism 325 can also include a mating nut rod 327, which has one end coupled to the suction cup assembly, and the other end is threaded to the threaded rod 326. The coupling between the mating nut rod 327 and the suction cup assembly can include a rotatable coupling 328, to allow the mating nut rod 327 to rotate relative to the suction cup assembly. When the mating nut rod 327 rotates relative to the threaded rod 326, the mating nut rod 327 is threaded into or away from the threaded rod 326, which can move the suction cup assemblies toward or away from each other.

The moving mechanism 325 can include a linear guide in the form of two smooth rods 336, which can function as directional guidance for the movements of the suction cup assemblies. The suction cup assemblies can be coupled to the smooth rods 336 through linear bearings 337, to allow the suction cup assemblies to move along the smooth rods.

The panel joiner 305 can include a top surface alignment mechanism 345, which can push on the top surfaces of both panels at the joined interface to align the two top surfaces. The mechanism 345 can include an alignment bar 347, which can be coupled to the linear guide 336, for example, through linear bearings 348, to move along the linear guide between the two suction cup assemblies. At the ends of the alignment bar 347, there can be two alignment feet assemblies, with each alignment feet assembly including a foot 346, which is coupled to a threaded rod, which is coupled to a handle. The threaded rod is threaded to the alignment bar 347, so that when the handle rotates, the threaded rod rotates against the alignment bar, and pushing to or pulling the foot away from the top surfaces of the panels.

FIGS. 4A-4C illustrate components of a panel joiner according to some embodiments. FIGS. 4A(a) and 4A(b) show a top view and a side view of a suction cup assembly. A suction cup assembly 410 can include a body 411 for housing a suction cup membrane 413. The suction cup assembly 410 can include a handle 412, which is movably coupled to the body 411 for pushing on the suction cup membrane 413.

The suction cup assembly can be disposed on a panel 480, e.g., the suction cup membrane 413 resting on the top surface of the panel 480. When the handle 412 pushes on the suction cup membrane 413, for example, by rotating the handle 412, the suction cup membrane can be deformed, pushing out air within the cavity of the membrane. The membrane can try to flex back to the original shape, and by doing so, exerting a vacuum in the cavity. The vacuum force can make the suction cup assembly adhere to the panel 480.

FIGS. 4B(a) and 4B(b) show a top view and a side view of a moving mechanism for moving the suction cup assemblies. A moving mechanism 420 can include a partially threaded rod 421, with one end of the threaded rod 421 coupled to a suction cup assembly. The moving mechanism 420 can also include a mating nut rod 422, which has one end coupled to the suction cup assembly 410B, and the other end is threaded to the threaded rod 421. The coupling between the mating nut rod 422 and the suction cup assembly can include a rotatable coupling 423, to allow the mating nut rod 422 to rotate relative to the suction cup assembly. When the mating nut rod 422 rotates relative to the threaded rod 421, the mating nut rod 422 is threaded into or away from the threaded rod 421, which can move the suction cup assemblies toward or away from each other.

The moving mechanism 420 can include a linear guide in the form of two smooth rods 431, which can function as directional guidance for the movements of the suction cup assemblies. The suction cup assembly 410B can be coupled to the smooth rods 431 through linear bearings 432, to allow the suction cup assemblies to move along the smooth rods.

In operation, the mating nut rod 422 rotates in a way to be threaded into the threaded rod 421, which can move the suction cup assemblies toward each other, effectively bringing the panels toward each other. The moving distance of the panels is the same as the moving distance of the mating nut rod 422 around the threaded rod 421. A complete rotation of the mating nut rod corresponds to a linear distance of one pitch distance of the threads in the threaded rod or in the mating nut rod.

FIGS. 4C(a) and 4C(b) show a top view and a side view of a top surface alignment mechanism for aligning the top surfaces of the panels. The panel joiner can include a top surface alignment mechanism 440, which can push on the top surfaces of both panels at the joined interface to align the two top surfaces. The mechanism 440 can include an alignment bar, which can be coupled to the linear guide 436, for example, through linear bearings 443, to move along the linear guide between the two suction cup assemblies. At the ends of the alignment bar, there can be two alignment feet assemblies, with each alignment feet assembly including a foot 441, which is coupled to a threaded rod, which is coupled to a handle 444. The threaded rod is threaded to the alignment bar, so that when the handle rotates, the threaded rod rotates against the alignment bar, and pushing to or pulling the foot away from the top surfaces of the panels.

In operation, a panel joiner is disposed on two adjacent panels, with one suction cup assembly 410A or 410B disposed on a panel 480A or 480B, respectively. The top surface alignment mechanism 440 is reset so that the feet 441 of the alignment feet assemblies are pulled up, away from the top surface of the panels. The suction cup assemblies are activated, so that the suction cup assemblies are securely adhered to the panels. A moving mechanism of the panel joiner is activated to pull the panels together to form a continuous joint, e.g., with no gaps between the panels.

The top surface alignment mechanism 440 is then slide across the linear guide 436, so that the feet 441 are disposed on the joint interface 481. The handle 444 of the alignment feet assemblies are rotated to move the feet 441 downward, pressing on the top surfaces of the panels at the joint interface 481. The feet can push on the panel having higher step, such as panel 480A as shown. The panel 480A is then pushed down, until it is aligned with the other panel 480B.

FIGS. 5A-5D illustrate a perspective view of different panel joiners according to some embodiments. A panel joiner 500 can include two suction cup assemblies 510, with each suction cup assembly including a flexible membrane 513 functioning as a suction cup, which is housed in a body 511. A handle 512 can be movably coupled to the body 511 for pushing or for releasing the suction cup membrane 513.

The two suction cup assemblies 510 can be coupled together through a moving mechanism 520. In this configuration, the moving mechanism 520 can include a threaded rod 521 (the threaded rods 521 can be partially threaded as shown), with one end of the threaded rod 521 coupled to a suction cup assembly, for example, fixedly coupled to the suction cup assembly at a coupling section 514. The moving mechanism 520 can also include a mating nut rod 522, which has one end coupled to the suction cup assembly, for example, rotatably coupled to the suction cup assembly at a coupling section 514. The coupling between the mating nut rod 522 and the suction cup assembly can include a rotatable coupling 523, to allow the mating nut rod 522 to rotate relative to the suction cup assembly. The other end of the mating nut rod 522 is threaded to the threaded rod 521.

When the mating nut rod 522 rotates relative to the threaded rod 521, the mating nut rod 522 is threaded into or away from the threaded rod 521, which can move the suction cup assemblies toward or away from each other.

The moving mechanism 520 can include a linear guide 530 in the form of two smooth rods 531, which can function as directional guidance for the movements of the suction cup assemblies. The suction cup assemblies can be coupled to the smooth rods 531 through linear bearings 532, to allow the suction cup assemblies to easily move along the smooth rods.

Figure 5A:
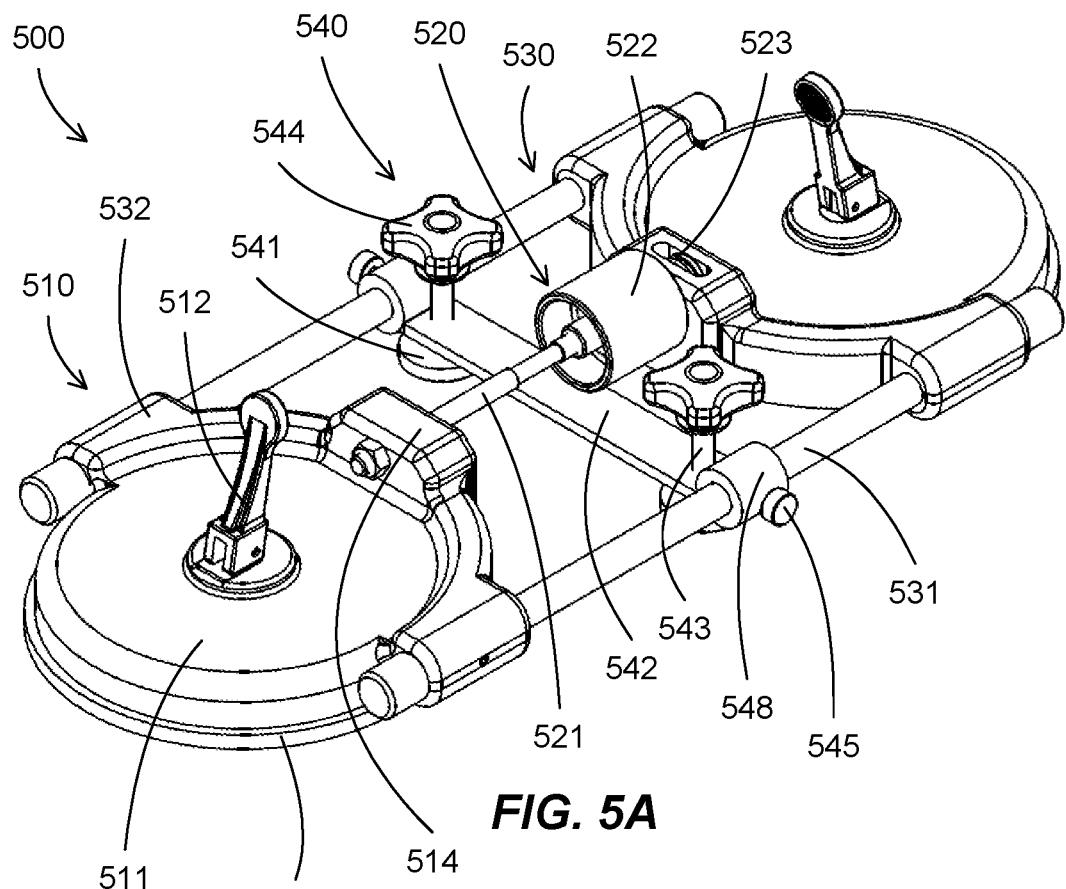
FIGS. 5A-5D illustrate a perspective view of different panel joiners according to some embodiments.

In FIG. 5A, a panel joiner 500 can include a top surface alignment mechanism 540, which can push on the top surfaces of both panels at the joined interface to align the two top surfaces. The mechanism 540 can include an alignment bar 542, which can be coupled to the linear guide 531, for example, through linear bearings 548, to move along the linear guide between the two suction cup assemblies. Lock screws 545 can be used to secure the linear bearing 548.

At the ends of the alignment bar 542, there can be two alignment feet assemblies, with each alignment feet assembly including a foot 541, which is coupled to a threaded rod 543, which is coupled to a handle 544. The threaded rod is threaded to the alignment bar 542, so that when the handle rotates, the threaded rod rotates against the alignment bar, and pushing to or pulling the foot away from the top surfaces of the panels.

Figure 5B:
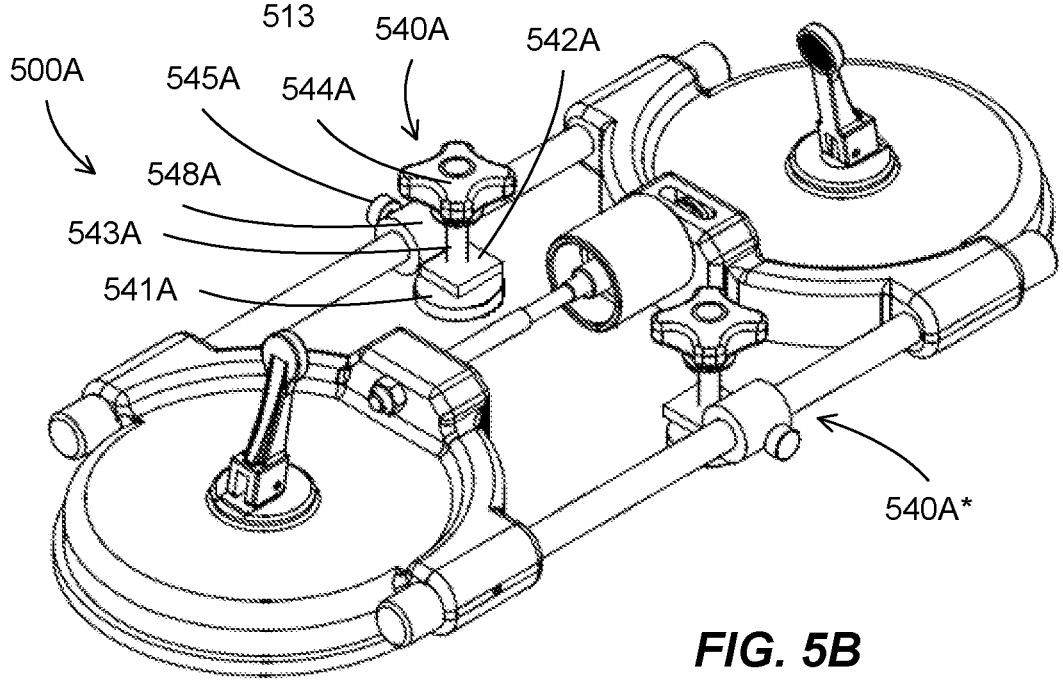

In FIG. 5B, the panel joiner 500A can include a top surface alignment mechanism which includes alignment modules 540A and 540A*. Each module 540A or 540A* can include an alignment bar coupled to a guide of the linear guide 531. The two modules can move independently along the linear guide. Each module can be positioned so that the alignment feet can be placed above the seam between the panels.

For example, module 540A can include an alignment bar 542A, which is coupled to the linear guide through linear bearings 548A, to move along the linear guide between the two suction cup assemblies. Lock screws 545A can be used to secure the linear bearing 548A to the linear guide, in the alignment bar 542A.

Each alignment bar can have an alignment feet assembly. For example, alignment bar 542A can have an alignment feet assembly which includes a foot 541A, which is coupled to a threaded rod 543A, which is coupled to a handle 544A.

The threaded rod is threaded to the alignment bar 542A, so that when the handle rotates, the threaded rod rotates against the alignment bar, and pushing to or pulling the foot away from the top surfaces of the panels.

Figure 5C:
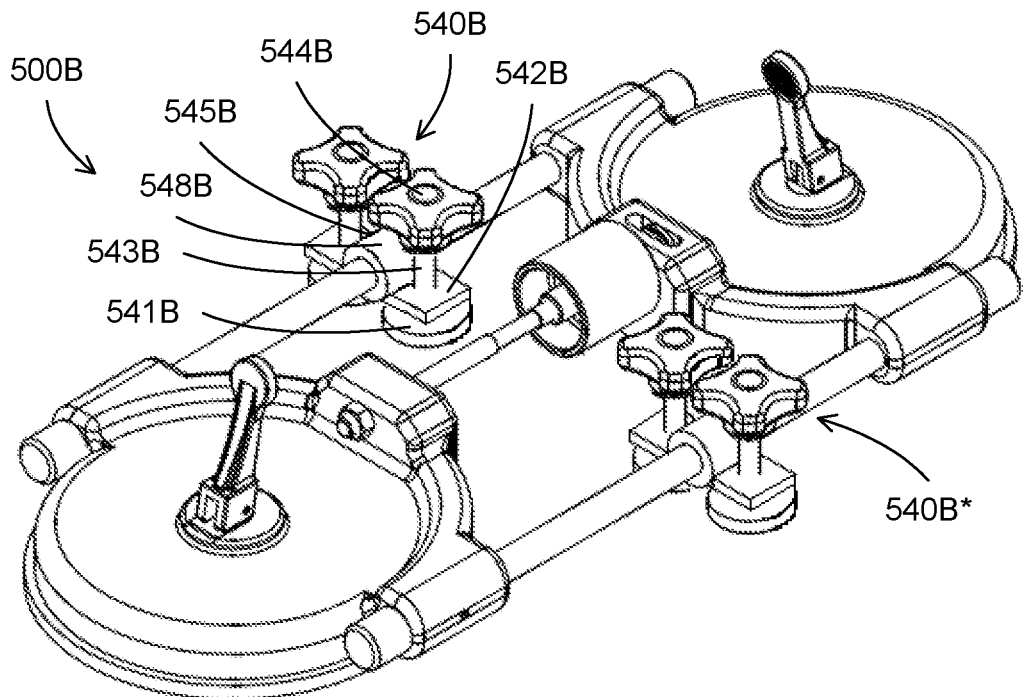

In FIG. 5C, the panel joiner 500B can include a top surface alignment mechanism which includes alignment modules 540B and 540B*. Each module 540B or 540B* can include an alignment bar coupled to a guide of the linear guide 531. The two modules can move independently along the linear guide. Each module can be positioned so that the alignment feet can be placed above the seam between the panels.

For example, module 540B can include an alignment bar 542B, which is coupled to the linear guide through linear bearings 548B, to move along the linear guide between the two suction cup assemblies. Lock screws 545B can be used to secure the linear bearing 548B to the linear guide, in the alignment bar 542B.

Each alignment bar can have two alignment feet assemblies. For example, alignment bar 542B can have two alignment feet assemblies positioned across the guide. The alignment feet assemblies can include 2 feet 541B, which are coupled to two threaded rods 543B, which are coupled to two handles 544B, respectively. The threaded rods are threaded to the alignment bar 542B, so that when the handles rotates, the threaded rods rotate against the alignment bar, and pushing to or pulling the feet away from the top surfaces of the panels.

Figure 5D:
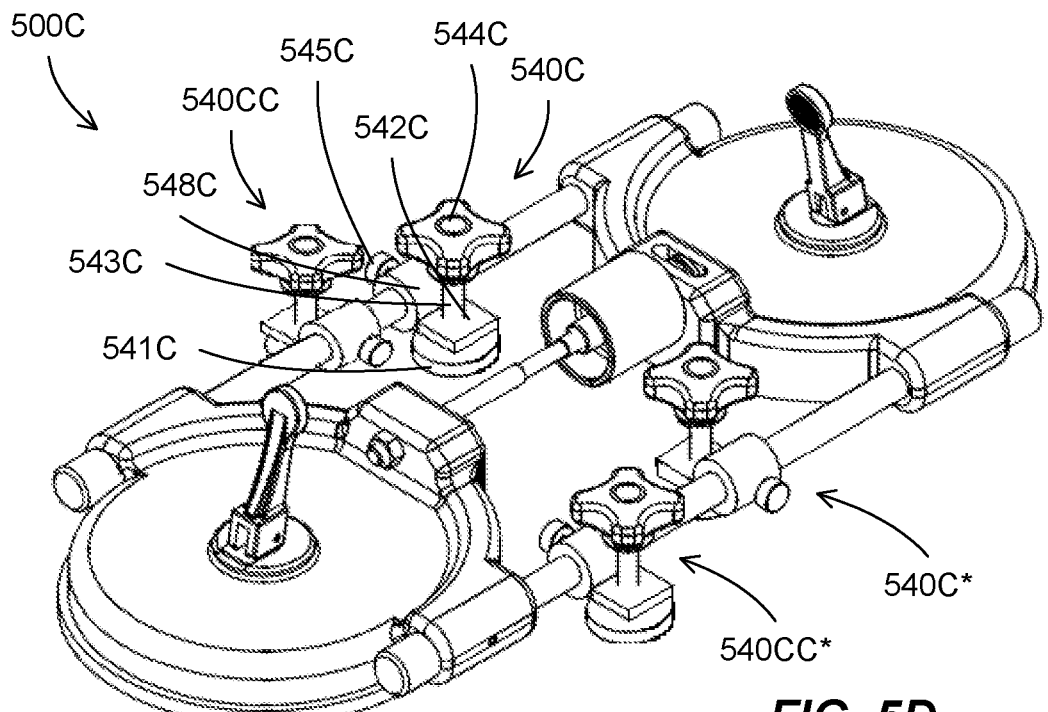

In FIG. 5D, the panel joiner 500C can include a top surface alignment mechanism which includes alignment modules 540C, 540CC, 540C* and 540CC*. Each module 540C, 540CC, 540C* and 540CC* can include an alignment bar coupled to a guide of the linear guide 531. The modules can move independently along the linear guide. Each module can be positioned so that the alignment feet can be placed above the seam between the panels.

For example, module 540C can include an alignment bar 542C, which is coupled to the linear guide through linear bearings 548C, to move along the linear guide between the two suction cup assemblies. Lock screws 545C can be used to secure the linear bearing 548C to the linear guide, in the alignment bar 542C.

Each alignment bar can have an alignment feet assembly. For example, alignment bar 542C can have an alignment feet assembly which includes a foot 541C, which is coupled to a threaded rod 543C, which is coupled to a handle 544C. The threaded rod is threaded to the alignment bar 542C, so that when the handle rotates, the threaded rod rotates against the alignment bar, and pushing to or pulling the foot away from the top surfaces of the panels.

Figure 6A:
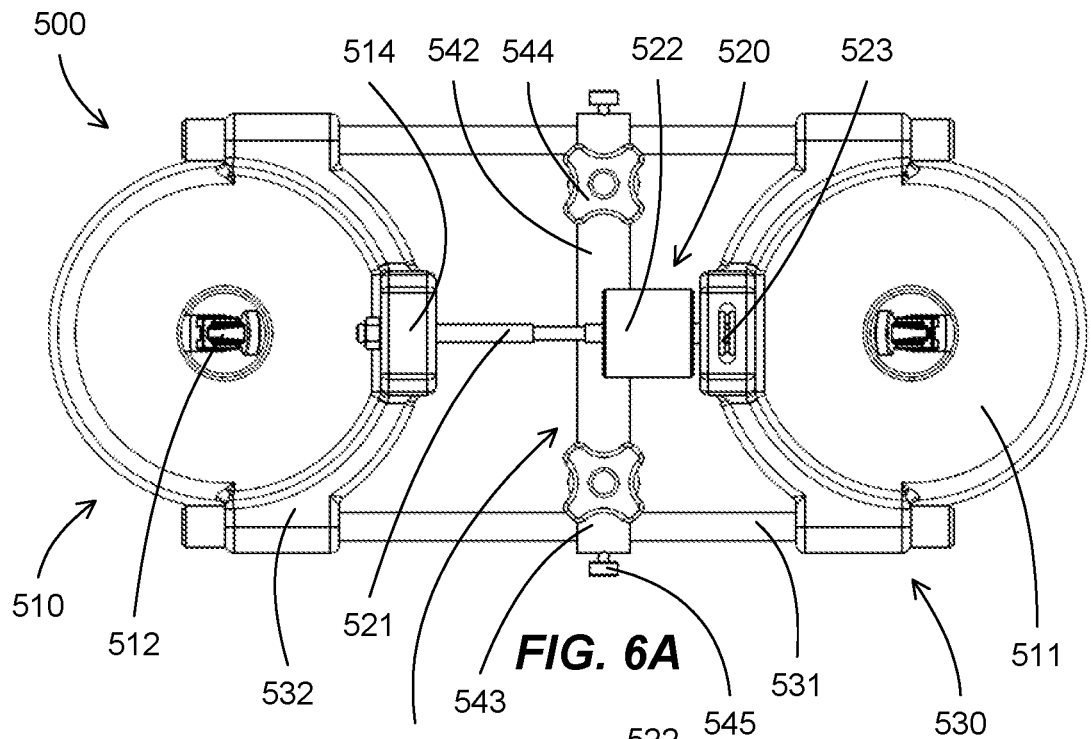
FIGS. 6A-6C illustrate a top view and two side views of the panel joiner 500 according to some embodiments.
Figure 6B:
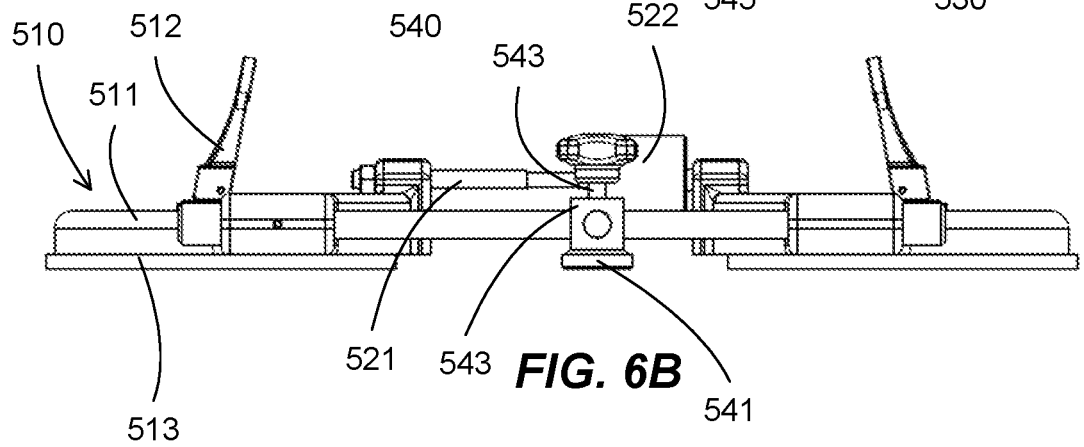
Figure 6C:
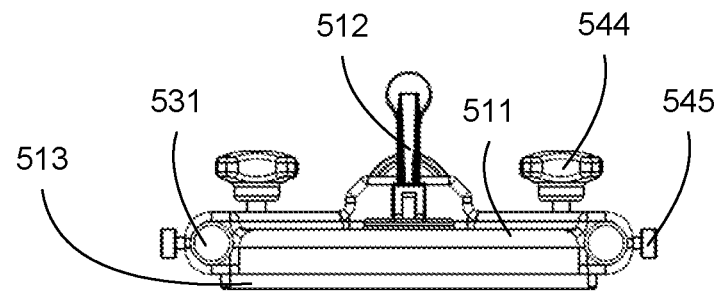

FIGS. 6A-6C illustrate a top view and two side views of the panel joiner 500 according to some embodiments.

FIGS. 7A-7D illustrate a perspective view, a top view and two side views of another panel joiner according to some embodiments. The panel joiner 700 can include 4 suction cup assemblies 710, with a linear guide 730 disposed between two suction cup assemblies.

A panel joiner 700 can include four suction cup assemblies 710, with each suction cup assembly including a flexible membrane 713 functioning as a suction cup, which is housed in a body 711. A handle 712 can be movably coupled to the body 711 for pushing or for releasing the suction cup membrane 713.

Two suction cup assemblies at one side can be coupled together through a coupling bar 736. The two pair of suction cup assemblies can be coupled together through a moving mechanism 720. In this configuration, the moving mechanism 720 can include a threaded rod 721 (the threaded rods 721 can be partially threaded as shown), with one end of the threaded rod 721 coupled to a coupling bar, for example, fixedly coupled to the coupling bar at a coupling section 714. The moving mechanism 720 can also include a mating nut rod 722, which has one end coupled to another coupling bar, for example, rotatably coupled to the coupling bar at a coupling section 723. The coupling between the mating nut rod 722 and the coupling bar can include a rotatable coupling 723, to allow the mating nut rod 722 to rotate relative to the coupling bar. The other end of the mating nut rod 722 is threaded to the threaded rod 721.

When the mating nut rod 722 rotates relative to the threaded rod 721, the mating nut rod 722 is threaded into or away from the threaded rod 721, which can move the suction cup assemblies toward or away from each other.

The moving mechanism 720 can include a linear guide 730 in the form of two smooth rods 731, which can function as directional guidance for the movements of the suction cup assemblies. The smooth rods 731 can be coupled to the suction cup assemblies through the coupling bar 736, using linear bearings to allow the coupling bars to easily move along the smooth rods.

The panel joiner 700 can include a top surface alignment mechanism 740, which can push on the top surfaces of both panels at the joined interface to align the two top surfaces. The mechanism 740 can include an alignment bar 742, which can be coupled to the linear guide 731, for example, through linear bearings 748, to move along the linear guide between the two suction cup assemblies.

At the ends of the alignment bar 742, there can be two alignment feet assemblies, with each alignment feet assembly including a foot 741, which is coupled to a threaded rod 743, which is coupled to a handle 744. The threaded rod is threaded to the alignment bar 742, so that when the handle rotates, the threaded rod rotates against the alignment bar, and pushing to or pulling the foot away from the top surfaces of the panels.

FIGS. 8A-8B illustrate flowcharts for forming panel joiners according to some embodiments. In FIG. 8A, operation 800 forms a panel joiner. The panel joiner can include two or more suction cups. The panel joiner can include a first moving mechanism coupled to a linear guide joining the two suction cups. The first moving mechanism can be configured to move the suction cups in a first lateral direction toward or away from each other. The panel joiner can include a second moving mechanism coupled to the linear guide. The second moving mechanism can be configured to move the suction cups in a second vertical direction perpendicular to the first lateral direction.

In FIG. 8B, operation 820 forms a panel joiner having two sets of suction cup assembly. Each set of suction cup assembly can include 1 or more suction cup assemblies. The panel joiner can include a first moving mechanism joining the two suction cups. The first moving mechanism can include two bars at two opposite sides of the suction cups to form a linear guide to guide the movements of the suction cups. The first moving mechanism can include a threaded rod having one end coupled to a first suction cup. The first moving mechanism can include a mating nut rod having one end coupled to a second suction cup. The threaded rod and the mating nut rod can be coupled to move the suction cups toward or away from each other in a first lateral direction along the linear guide when the threaded rod or the mating nut rod rotates.

The panel joiner can include a second moving mechanism coupled to the linear guide to move along the linear guide.

The second moving mechanism can include a soft pad movable in a second vertical direction perpendicular to the first lateral direction for pressing on a surface interface of the panels.

FIGS. 9A-9F illustrate a process to join two panels using a panel joiner according to some embodiments. The panels are prepared for joining, such as preparing the interface surfaces, e.g., the side edge surfaces of the panels that are to be joined together. For example, the side edge surfaces can be made flat and can form an edge joint to provide a flat joined surface, e.g., the angles that the side edge surfaces made with the top lateral surfaces of the panels are complementary (meaning added up to 180 degrees) so that after joined, the panels form a flat surface. For example, the side edge surfaces can be perpendicular to the lateral top surfaces of the panels. Thus, the side edge surfaces of the panels are aligned to provide a cosmetic joint, e.g., an invisible seam at the joined interface.

In some embodiments, the widths of the panels, e.g., the length of the side edge surfaces that will be joined together, are the same, so that the joined panel can have continuous and smooth surfaces at the other side edges across the joined interface. Thus, the widths of the panels are also aligned, e.g., the corners of the side edge surfaces can present a continuous and smooth surface across the joined interface.

For example, two corners at a side edge surface of one panel are aligned with two corners of a side edge surface of another panel, to form a continuous panel. For example, two rectangular panels, each having a same width and a same length, can be joined at the length sides, e.g., the side surface along the length of one panel is joined with the side surface along the length of another panel. The width of the panels can be aligned, e.g., the end corners of the length side edge surface of one panel match with the end corners of the length side edge surface of another panel, in order to form a rectangular panel having a same length and with twice the width. Alternatively, only one corner at a side edge surface of one panel is aligned with one corner of a side edge surface of another panel, to form an elbow panel.

FIGS. 9A(a) and 9A(b) show a first optional step of a joining process of two panels 910 and 911. FIG. 9A(a) shows a top view and FIG. 9A(b) shows a side view of the two panels, together with a panel joiner 900. As shown, the panels are rectangular panels. Different types of panels can be used. The panels can be placed side by side so that a length 960 of one panel 910 faces the length 963 of another panel 911. The panels can be aligned along the lengths, e.g., the side edge surface 970 along the length 960 of panel 910 are placed parallel with the side edge surface 971 along the length 963 of panel 911, with a parallel gap 940 between the panels. The panels can be aligned at the ends of the lengths, e.g., the end corner 961 of the length 960 of panel 910 is aligned with the end corner 964 of the length 963 of panel 911, and the end corner 962 of the length 960 of panel 910 is aligned with the end corner 965 of the length 963 of panel 911.

The panels can also be aligned at the top surfaces 972 and 973 of panels 910 and 911, respectively, to achieve a flat surface at the joined interface, e.g., there is no gaps and no steps on the top surfaces 872 and 973, especially going across the joined interface. As shown, the panels 910 and 911 are not aligned at the top surfaces, for example, due to imperfections at the support surface on which the panels are disposed on.

A panel joiner 900 can be placed on the panels, with suction cup assemblies of the panel joiner disposed on both panels to allow movements of the panel joiner to move the panels.

FIGS. 9B(a) and 9B(b) show a next step of the joining process of two panels 910 and 911. FIG. 9B(a) shows a top view and FIG. 9B(b) shows a side view. A moving mechanism of the panel joiner 900 can be activated to bring the panels together, e.g., touching along the lengths 960 and 963 of the side edge surfaces 970 and 971. The panels are aligned at the joined interface, including side edge surface alignment and corner alignment. In the side edge surface alignment, the side edge surfaces 970 and 971 contact each other to form a cosmetic seam 950, with no gaps between the two side edge surfaces 970 and 971. In the corner alignment, the corners 961 and 964 contact each other to form a cosmetic seam 951, with no steps between the two panels 910 and 911. The corners 962 and 965 also contact each other to form a cosmetic seam 952, with no steps between the two panels 910 and 911.

As shown, the panels 910 and 911 are not aligned at the top surfaces, e.g., the moving mechanism of the panel joiner is not designed for top surface alignment procedures.

In some embodiments, this step and the previous can be optional. In other words, two panels can be brought together manually, e.g., without the use of the panel joiner. A worker can place two panels next to each other, and then manually align the panels along the length of the panels, e.g., aligning the side edge surface 970 to be parallel and touching the side edge surface 971, and also manually align the panels at the ends of the length of the panels, e.g., aligning corner 961 with corner 964, and corner 962 with corner 965. Thus, the manual set up of the panels can provide the panel configuration as shown in FIG. 9B, without using the panel joiner.

FIG. 9C shows a next step of the joining process of two panels 910 and 911. If the panels are manually set up, then a panel joiner can be placed on the panels, with suction cup assemblies of the panel joiner disposed on both panels to allow movements of the panel joiner to move the panels.

If the panels are set up using a panel joiner, the panel joiner is already disposed on the panels. A second moving mechanism of the panel joiner 900 can be activated to align the panels at the top surfaces 972 and 972. The second moving mechanism can be reset before using, e.g., before being placed on the panels. In the reset state, the top surface alignment feet of the second moving mechanism can be moved up, to create a distance between the feet bottom surface and the top surfaces of the panels.

The second moving mechanism can be moved between the suction cup assemblies so that the top surface alignment feet are disposed on the joined interface of the panels. The second moving mechanism then can be activated, e.g., the feet move down 902 to contact the top surfaces. The top surfaces are than aligned, e.g., to be on a same flat surface defined by the feet bottom surface. The joined interface 953 between the two top surfaces 972 and 973 are aligned, e.g., forming a smooth (e.g., no steps) and continuous (e.g., no gaps) surface across the joined interface.

FIGS. 9D(a) and 9D(b) show a next step of the joining process of two panels 910 and 911. FIG. 9D(a) shows a top view and FIG. 9D(b) shows a side view. The second moving mechanism can be deactivated, e.g., the feet move up 903 to clear the top surfaces. The moving mechanism of the panel joiner 900 can be deactivated, e.g., the suction cup assemblies move apart 904 to separate the panels, e.g., forming a gap 941 between the panels.

FIGS. 9E(a) and 9E(b) show a next step of the joining process of two panels 910 and 911. FIG. 9E(a) shows a top view and FIG. 9E(b) shows a side view. An adhesion layer 920 can be applied to one or two side edge surfaces, such as to the side edge surface 970. The moving mechanism of the panel joiner 900 can be reactivated, e.g., the suction cup assemblies move together 905, until the panels are touching each other, with the adhesive layer 920 in between.

FIG. 9F shows an optional next step of the joining process of two panels 910 and 911. The second moving mechanism then can be reactivated, to ensure that the top surfaces are aligned.

FIG. 10 illustrates a flowchart to join panels according to some embodiments. Operation 1000 places first and second panels on a support, with the second panel spaced apart from the first panel. The support can be a flat surface table, a roller ball surface table, or a table with a half flat surface and a half roller ball surface.

Operation 1010 places a panel joiner on the two panels. A first suction cup assembly of the panel joiner is disposed on a surface of the first panel. A second suction cup assembly of the panel joiner is disposed on a surface of the second panel. Feet of a soft pad feet assembly of the panel joiner are moved away from the top surface of the panels.

Operation 1020 activates the suction cup assemblies so that the suction cups adhere to the first and second panels. Operation 1030 rotates a nut rod or a threaded rod of the panel joiner to move the first and second panels toward each other for contacting each other, with the movement running along a linear guide of the panel joiner. Operation 1040 moves the soft pad feet assembly along the linear guide so that the soft pad feet are disposed above a contact interface of the first and second panels. Operation 1050 adjusts a position of the soft pad feet to align the surfaces of the first and second panels.

Figure 11A:
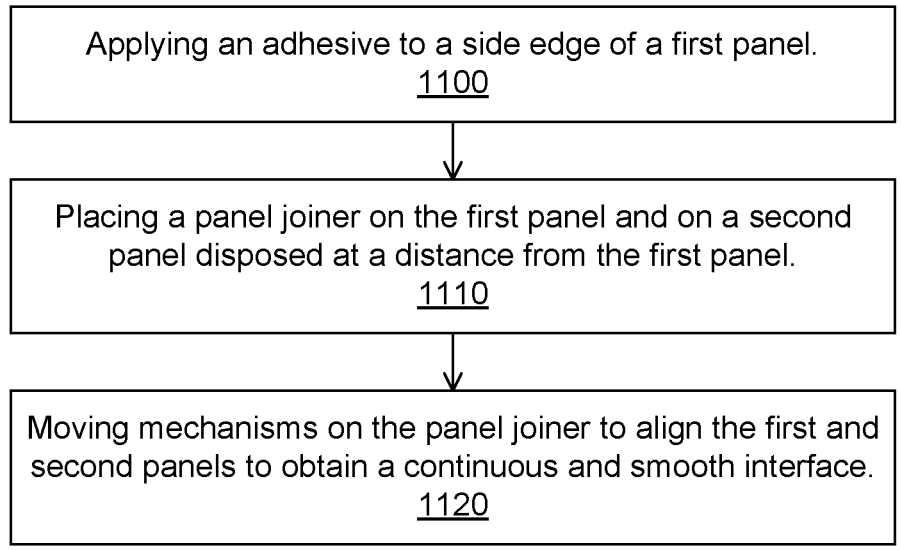
FIGS. 11A-11B illustrate flowcharts to join panels according to some embodiments.
Figure 11B:
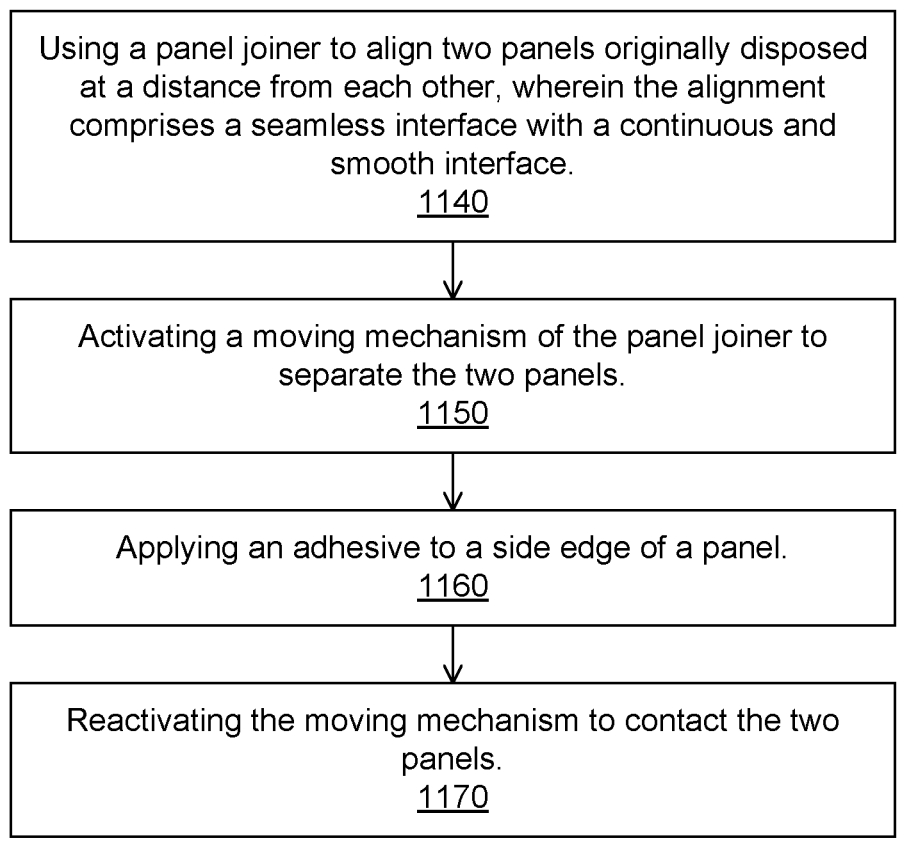

FIGS. 11A-11B illustrate flowcharts to join panels according to some embodiments. The first and second panels can be placed apart from each other, and a panel joiner can be used to join the two panels. In FIG. 11A, operation 1100 applies an adhesive to a side edge surface of a first panel. Operation 1110 places a panel joiner on the first panel and on a second panel disposed at a distance from the first panel. Operation 1120 moves mechanisms on the panel joiner to align the first and second panels to obtain a continuous and smooth interface.

Alternatively, two panels can be placed joining each other, with a manually alignment. A panel joiner can be used to separate the panels. An adhesion can be applied to a joined surface. The panel joiner can be used again to join the two panels.

For example, two panels can be placed on a support. The panels are aligned so that the joined surfaces are touching each other, with the ends of the joined surface aligned to each other. A panel joiner can be placed on the panels. Suction cup assemblies are activated to secure the panel joiner to the panels. Top surface alignment mechanism is operated to align the top surface. The top surface alignment mechanism is operated again to separate the feet from the top surfaces. Moving mechanism is then operated to separate the panels. An adhesive layer is applied to one or two side edge surfaces. The moving mechanism is operated again to join the panels. Optionally, the top surface alignment mechanism is operated again to align the top surface.

In FIG. 11B, two panels can be placed apart from each other. A panel joiner can be used to join the panels with proper alignment. The panel joiner can be used again to separate the panels. An adhesion can be applied to a joined surface. The panel joiner can be used again to join the panels.

Operation 1140 uses a panel joiner to align two panels originally disposed at a distance from each other. The alignment can include a seamless interface with a continuous and smooth interface. Operation 1150 activates a moving mechanism of the panel joiner to separate the two panels. Operation 1160 applies an adhesive to a side edge of a panel. Operation 1170 reactivates the moving mechanism to contact the two panels.

In some embodiments, the present invention discloses panel joiner systems with a minor adjustable mechanism for joining and aligning panels. The minor adjustable mechanism can assist in moving the panels, e.g., moving one panel relative to another panel, small distances to achieve proper alignments between the panels, for example, to achieve an invisible seam with no gaps and no steps across the seam.

The minor adjustment mechanism can include a compressible material such as a rubber or a soft plastic material, or a flowable material such as a high viscosity fluid. The compressible material or the flowable material can be disposed surrounding a suction cup sub-assembly, to separate the suction cup sub-assembly from the body of the panel joiner, such as to separate the suction cup from the housing that houses the suction cup.

The minor adjustment mechanism can allow a manual minor adjustment, such as a small rotation to align the side edge surfaces, in the event that the two side edge surfaces are not properly parallel, and a small linear movement to align the corners of the panels, in the event that the ends of the side edge surfaces have a slight mismatch.

For example, the minor adjustment mechanism can provide a linear movement of less than 10 mm, or less than 5 mm, or less than 2 mm, or less than 1 mm. The minor adjustment mechanism can provide a rotational movement of less than 10 degrees, or less than 5 degrees, or less than 2 degrees, or less than 1 degree. In general, the misalignment can be caused by the difficulty to manually form and to manually maintain a perfect alignment between the two panels. Thus, the panels can be aligned as best as a worker, a skilled or non skilled worker, can provide, and then the panel joiner with a minor adjustment mechanism can perform the minor adjustment to achieve the perfect alignment for an invisible joint.

The minor adjustment mechanism can be coupled to one suction cup, such as the suction cup fixedly coupled to the guides of the linear guide, or the suction cup movably coupled to the guides of the linear guide. The minor adjustment mechanism can be coupled to both suction cups, e.g., to the suction cups on both panels.

Figure 12A:
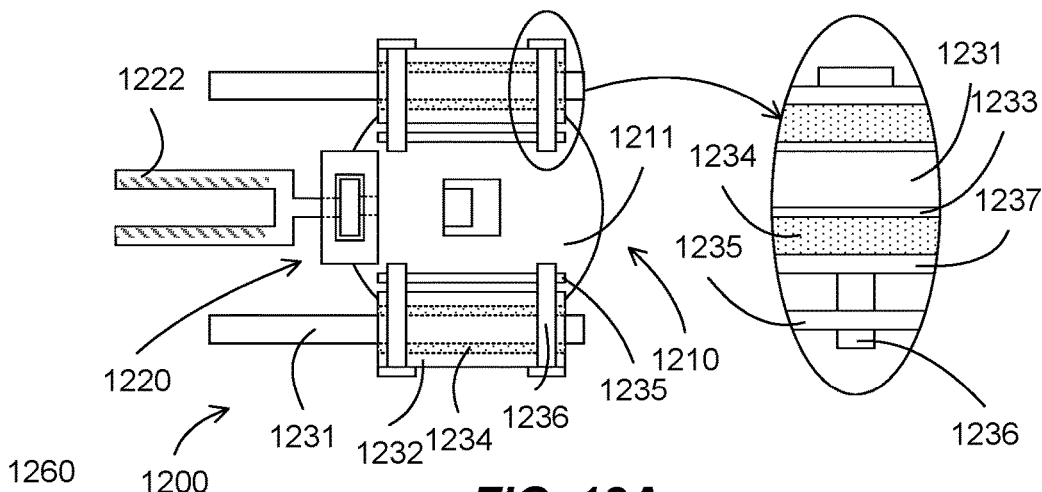
FIGS. 12A-12C illustrate a minor adjustment mechanism for a panel joiner according to some embodiments.
Figure 12B:
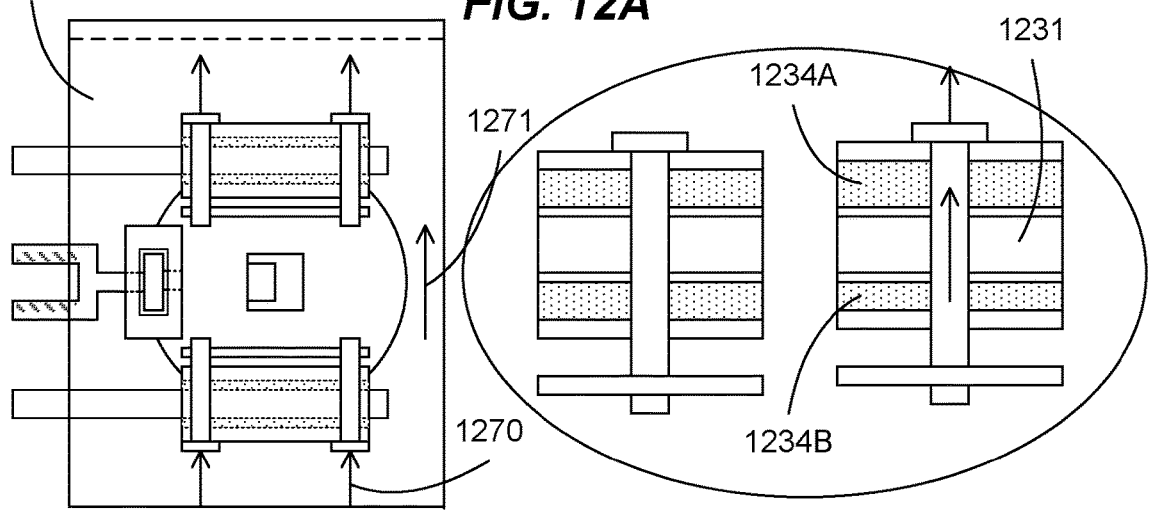
Figure 12C:
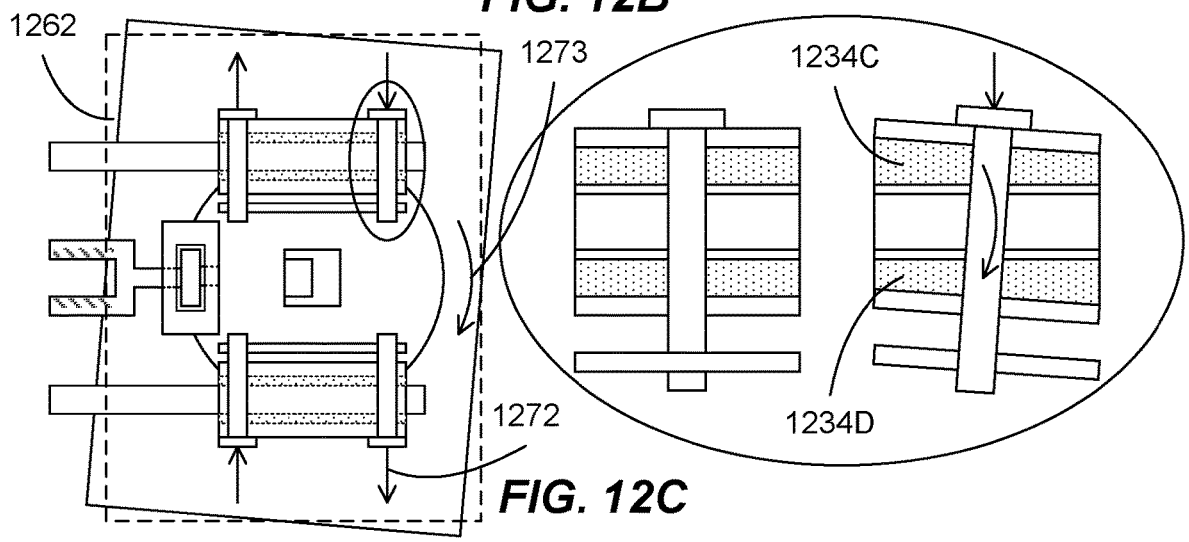

FIGS. 12A-12C illustrate a minor adjustment mechanism for a panel joiner according to some embodiments. A panel joiner 1200 can include multiple suction cup assemblies 1210. A suction cup assembly 1210 can include a suction cup membrane for forming a vacuum adhesion to a panel. The suction cup membrane can be housed in a suction body 1211. A handle can be movably coupled to the suction cup body to activate the suction cup membrane. A portion of a moving mechanism, such as a mating nut rod 1222 can be rotatably coupled to the body for moving the suction cup assembly toward or away from another suction cup assembly. A linear guide, such as two smooth rods 1231 can be coupled to the body through linear bearing assembly 1232 to guide the body to move along a preset direction.

A minor adjustment mechanism can include a compressible material 1234, such as a rubber or a polymer, can be provided between the suction cup assembly 1210 and the linear guide rods 1231. The compressible material 1234 can allow the suction cup assembly 1210 to move a small distance relative to the linear guide rods 1231. The compressible material can be disposed in the linear bearing assembly 1232. For example, the compressible material can be disposed surrounding a linear bearing 1233, which can be slide along the linear guide rod 1231. A linear bearing housing 1237 of the linear bearing assembly 1232 can be used to house the linear bearing 1233 and the compressible material 1234. The compressible material can be positioned in either one suction cup, e.g., at the guides coupled to the suction cup, or in both suction cups.

The minor adjustment mechanism can include a moving mechanism, such as a screw shaft threaded to a fixed nut. The moving mechanism can be used for moving the suction cup assembly 1210 relative to the linear guide rods 1231. For example, if the screw shafts are further threaded in one linear direction 1270, the suction cup assembly can push 1234B and pull 1234A on the compress material and can be slightly move 1271 in the threaded direction. The movement of the suction cup assembly 1210 can move the panel 1260 in the direction 1271, such as a direction perpendicular to the linear guide rods 1231.

If the screw shafts are further threaded in one rotational direction 1272, the suction cup assembly can push 1234D and pull 1234C on different portions of the compress material and can be slightly rotate 1273 in the threaded rotational direction. The rotational movement of the suction cup assembly 1210 can move the panel 1262 in the rotational direction 1273, such as around a rotational axis perpendicular to the lateral top surface of the panel 1262.

Figure 13A:
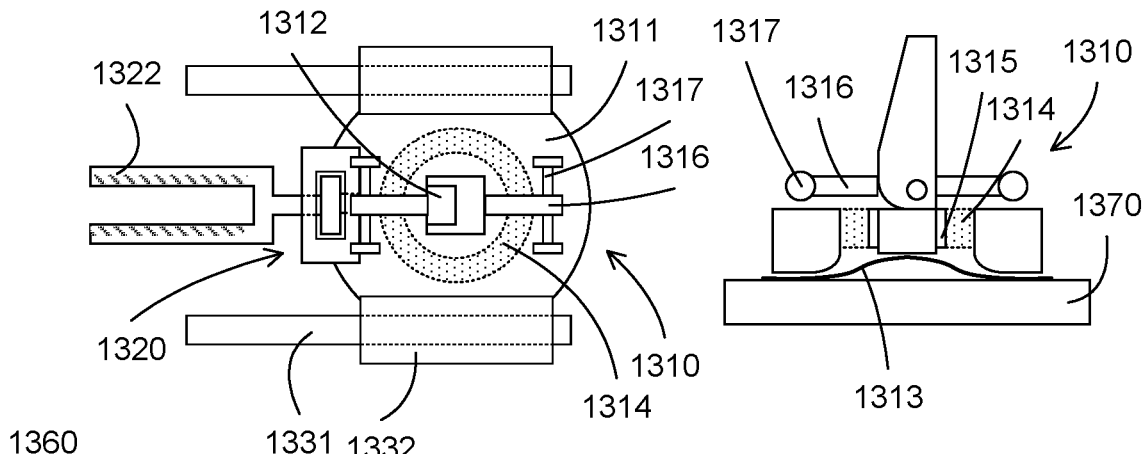
FIGS. 13A-13C illustrate another minor adjustment mechanism for a panel joiner according to some embodiments.
Figure 13B:
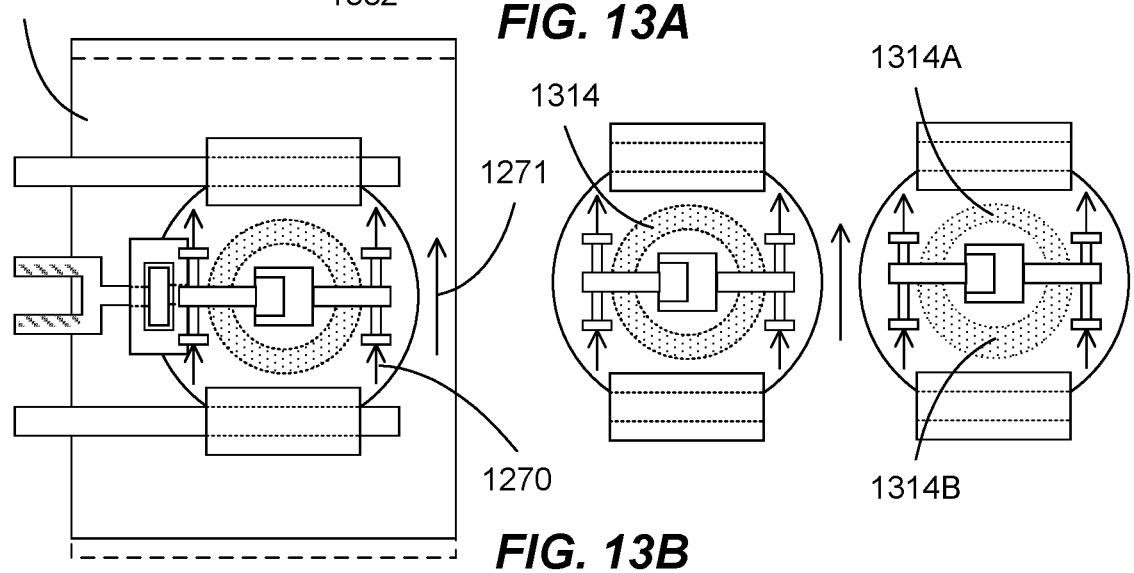
Figure 13C:
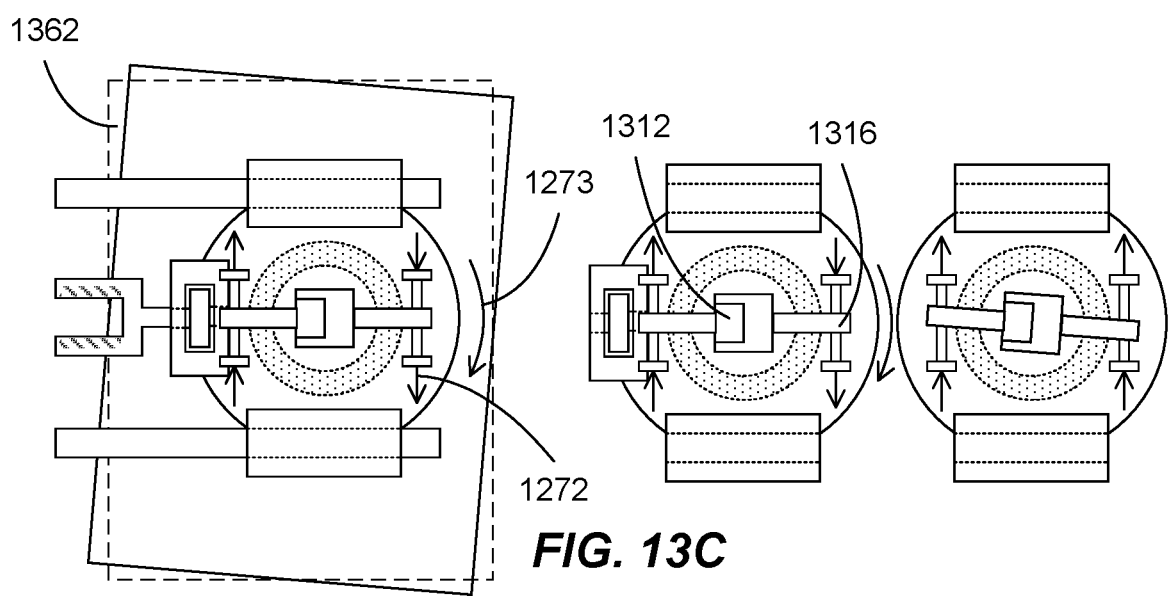

FIGS. 13A-13C illustrate another minor adjustment mechanism for a panel joiner according to some embodiments. A panel joiner 1300 can include multiple suction cup assemblies 1310. A suction cup assembly 1310 can include a suction cup membrane for forming a vacuum adhesion to a panel. The suction cup membrane can be housed in a suction body 1311. A handle 1312 can be movably coupled to the suction cup body to activate the suction cup membrane. A portion of a moving mechanism, such as a mating nut rod 1322 can be rotatably coupled to the body for moving the suction cup assembly toward or away from another suction cup assembly. A linear guide, such as two smooth rods 1331 can be coupled to the body through linear bearing assembly 1332 to guide the body to move along a preset direction.

A minor adjustment mechanism can include a compressible material 1314, such as a rubber or a polymer, can be provided between the suction cup portion including the suction cup handle 1312 and the suction cup body 1311. The compressible material 1314 can allow the suction cup to move a small distance relative to the body and other components of the panel joiner such as the linear guide rods 1331. The compressible material can be disposed around the suction cup portion. For example, the compressible material can be in a form of a ring, such as a square cross section ring, surrounding the handle 1312. The compressible material can be positioned in either one suction cup, e.g., surrounding the flexible membrane of the suction cup, or in both suction cups.

The minor adjustment mechanism can include a moving mechanism, such as a bar 1316 extended from the handle 1312, and screw shafts 1317 through the bar 1316 threaded to a fixed nut. The moving mechanism can be used for moving the suction cup portion relative to the body 1311.

For example, if the screw shafts are further threaded in one linear direction 1370, the bar 1316 linked to the suction cup portion can push 1314A and pull 1314B on the compress material and can be slightly move 1371 in the threaded direction. The movement of the suction cup portion 1310 can move the panel 1360 in the direction 1371, such as a direction perpendicular to the linear guide rods 1331.

If the screw shafts are further threaded in one rotational direction 1372, the bar 1316 linked to the suction cup portion can push and pull on different portions of the compress material and can be slightly rotate 1373 in the threaded rotational direction. The rotational movement of the suction cup portion 1310 can move the panel 1362 in the rotational direction 1373, such as around a rotational axis perpendicular to the lateral top surface of the panel 1362.

Figure 14A:
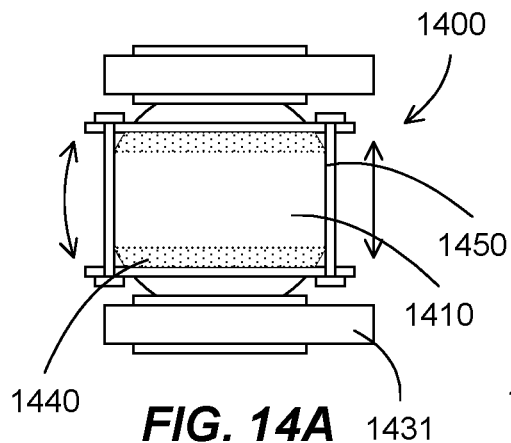
FIGS. 14A-14F illustrate configurations for a minor adjustment mechanism according to some embodiments.

FIGS. 14A-14F illustrate configurations for a minor adjustment mechanism according to some embodiments. In FIG. 14A, a minor adjustment mechanism in a panel joiner 1400 can include compressible bars 1440 disposed across the body of the suction cup assembly 1410, to separate the suction cup portion with the linear guide rods 1431. Threaded shafts 1450 can connect the two separate portions of the linear guide rods, and can be used to adjust the relative position of the suction cup portion with the linear guide rods.

Figure 14B:
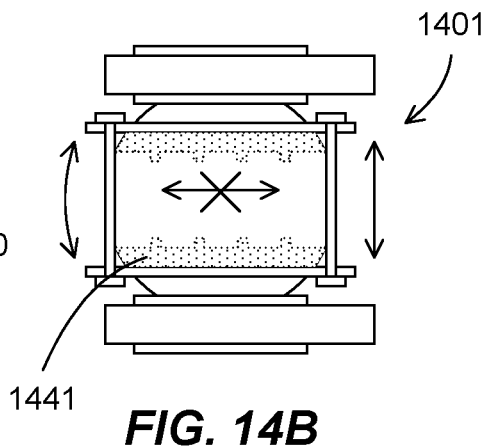

In FIG. 14B, a minor adjustment mechanism in a panel joiner 1401 can include compressible bars 1442 disposed across the body of the suction cup assembly. The compressible bars 1442 can include protruded portions to limit the movements in a horizontal direction as shown. The movements in the vertical direction and the rotational movements can be performed.

Figure 14C:
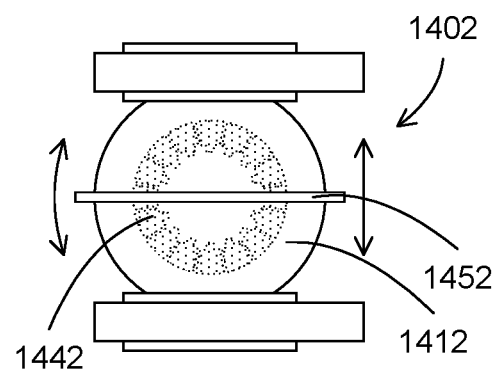

In FIG. 14C, a minor adjustment mechanism in a panel joiner 1402 can include a compressible ring 1442 disposed around the suction cup portion, such as around the handle of the suction cup assembly, to separate the suction cup portion with the body and the linear guide rods. The compressible ring can have cuts in the ring to facilitate the compressive movements of the compressible material. Handle shafts 1452 can run across the suction cup portion, and can be used to adjust the relative position of the suction cup portion with the body of the panel joiner.

Figure 14D:
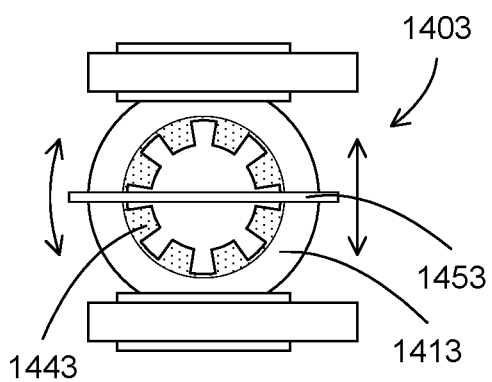

In FIG. 14D, a minor adjustment mechanism in a panel joiner 1403 can include a compressible ring 1443 disposed around the suction cup portion. The suction cup portion can have protrusions, which is corresponded to recesses in the compressible ring, which can facilitate the compressive movements of the compressible material. Handle shafts 1453 can run across the suction cup portion, and can be used to adjust the relative position of the suction cup portion with the body of the panel joiner.

Figure 14E:
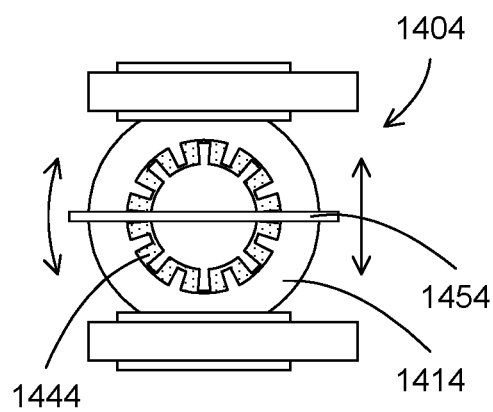

In FIG. 14E, a minor adjustment mechanism in a panel joiner 1404 can include a compressible ring 1444 disposed around the suction cup portion. The suction cup portion and the body can have protrusions, which is corresponded to recesses in the compressible ring, which can facilitate the compressive movements of the compressible material. Handle shafts 1454 can run across the suction cup portion, and can be used to adjust the relative position of the suction cup portion with the body of the panel joiner.

Figure 14F:
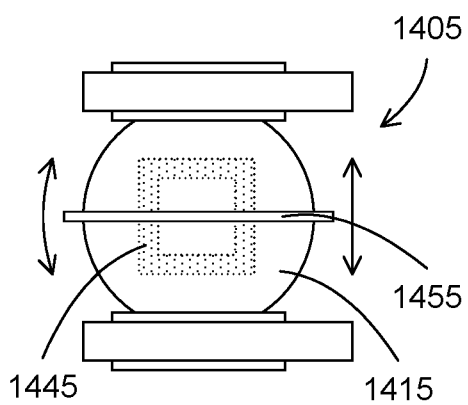

In FIG. 14F, a minor adjustment mechanism in a panel joiner 1404 can include a compressible square 1444 disposed around the suction cup portion. Handle shafts 1454 can run across the suction cup portion, and can be used to adjust the relative position of the suction cup portion with the body of the panel joiner.

In the above description, a compressible material is used in the minor adjustment mechanism. A flowable material can be used, instead and in addition to the compressible material, which can allow movements of the suction cup portion relative to the body of the panel joiner. The compressible material can be positioned in either one suction cup, or in both suction cups.

FIGS. 15A-15C illustrate flowcharts for forming panel joiner having a compressible material according to some embodiments. In FIG. 15A, operation 1500 forms a panel joiner. The panel joiner can include two suction cups and a moving mechanism coupled to the two suction cups for moving the two suction cups relative to each other. The panel joiner can include a compressible material between a suction cup of the two suction cups and the moving mechanism. The compressible material can be configured to allow relative rotational and linear movements of the suction cup.

In FIG. 15B, operation 1520 couples a compressible material between a suction cup and a moving mechanism of a panel joiner. The compressible material can include a dimension sufficient to allow the suction cup to move a distance relative to the moving mechanism. The distance can be less than 5 mm.

In FIG. 15C, operation 1540 couples a compressible material between a suction cup and a moving mechanism of a panel joiner. The suction cup further can include a handle to assist in moving the suction cup relative to the moving mechanism.

Figure 16A:
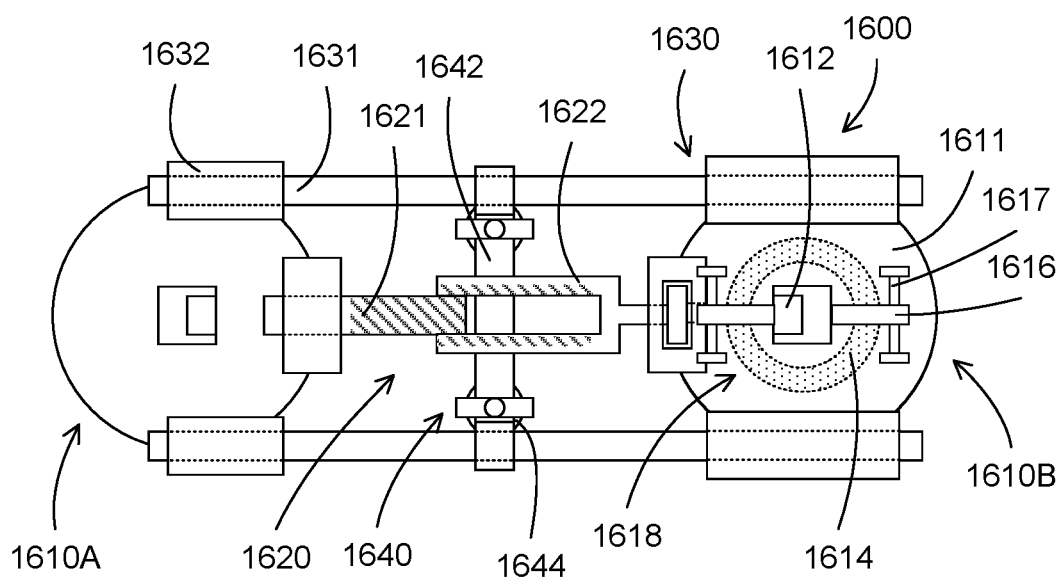
FIGS. 16A-16B illustrate configurations for a panel joiner having a minor adjustment mechanism according to some embodiments.
Figure 16B:
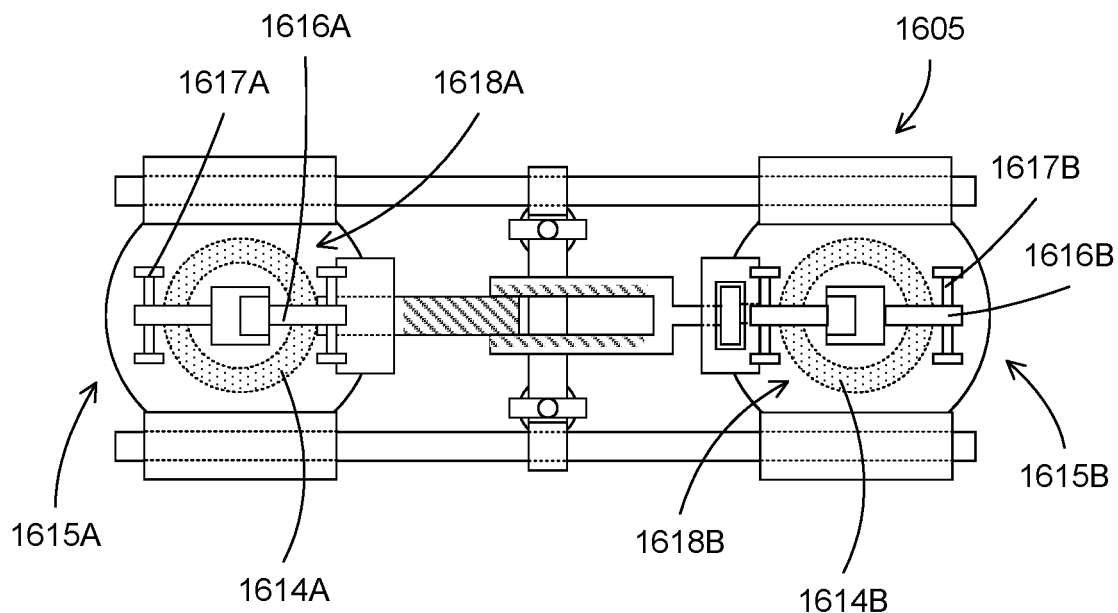

FIGS. 16A-16B illustrate configurations for a panel joiner having a minor adjustment mechanism according to some embodiments. FIG. 16A shows a panel joiner 1600 having one suction cup assembly 1610B having a minor adjustment mechanism 1618. FIG. 16B shows a panel joiner 1605 having both suction cup assemblies 1615A and 1615B, each having a minor adjustment mechanism 1618A and 1618B, respectively.

A panel joiner 1600 can have one suction cup assembly 1610B having a minor adjustment mechanism 1618, e.g., the body of the suction cup assembly 1610B is coupled to the suction cup portion through a compressible or flowable material. The other suction cup assembly 1610A does not have a minor adjustment mechanism, e.g., the body of the suction cup assembly 1610A is coupled directly to the suction cup portion.

The panel joiner 1600 can include two suction cup assemblies 1610A and 1610, joined together by a moving mechanism 1620 and a linear guide 1630. The moving mechanism 1620 can include a threaded rod 1621 having one end fixedly coupled to the suction cup assembly 1610A. The other end of the threaded rod 1621 is threaded to a mating nut rod 1622, having the other end rotatably coupled to the suction cup assembly 1610B. The linear guide 1630 can include two smooth rods 1631, which are coupled to the suction cup assemblies 1610A and 1610B through linear bearing assemblies 1632. The panel joiner 1600 can include a top surface alignment mechanism 1640, which includes an alignment bar 1642 coupled to the linear guide 1630. The top surface alignment mechanism 1640 can also include alignment feet 1644, which can force the top surfaces of the panels to be leveled.

The suction cup assembly 1610B can include a minor adjustment mechanism 1618, which includes a compressible or flowable ring 1614 surrounding the suction cup portion and the suction cup handle 1612. The suction cup portion can include a bar 1616 with screw shafts 1617 for adjusting the positions of the suction cup portion, relative to the body of the panel joiner.

The panel joiner 1605 can include two suction cup assemblies 1615A and 1615B, both with a minor adjustment mechanism 1618A and 1618B, respectively. The minor adjustment mechanism 1618A/1618B can include a compressible or flowable ring 1614A/1614B surrounding the suction cup portion and the suction cup handle. The suction cup portion can include a bar 1616A/1616B with screw shafts 1617A/1617B for adjusting the positions of the suction cup portion, relative to the body of the panel joiner.

Figure 17C:
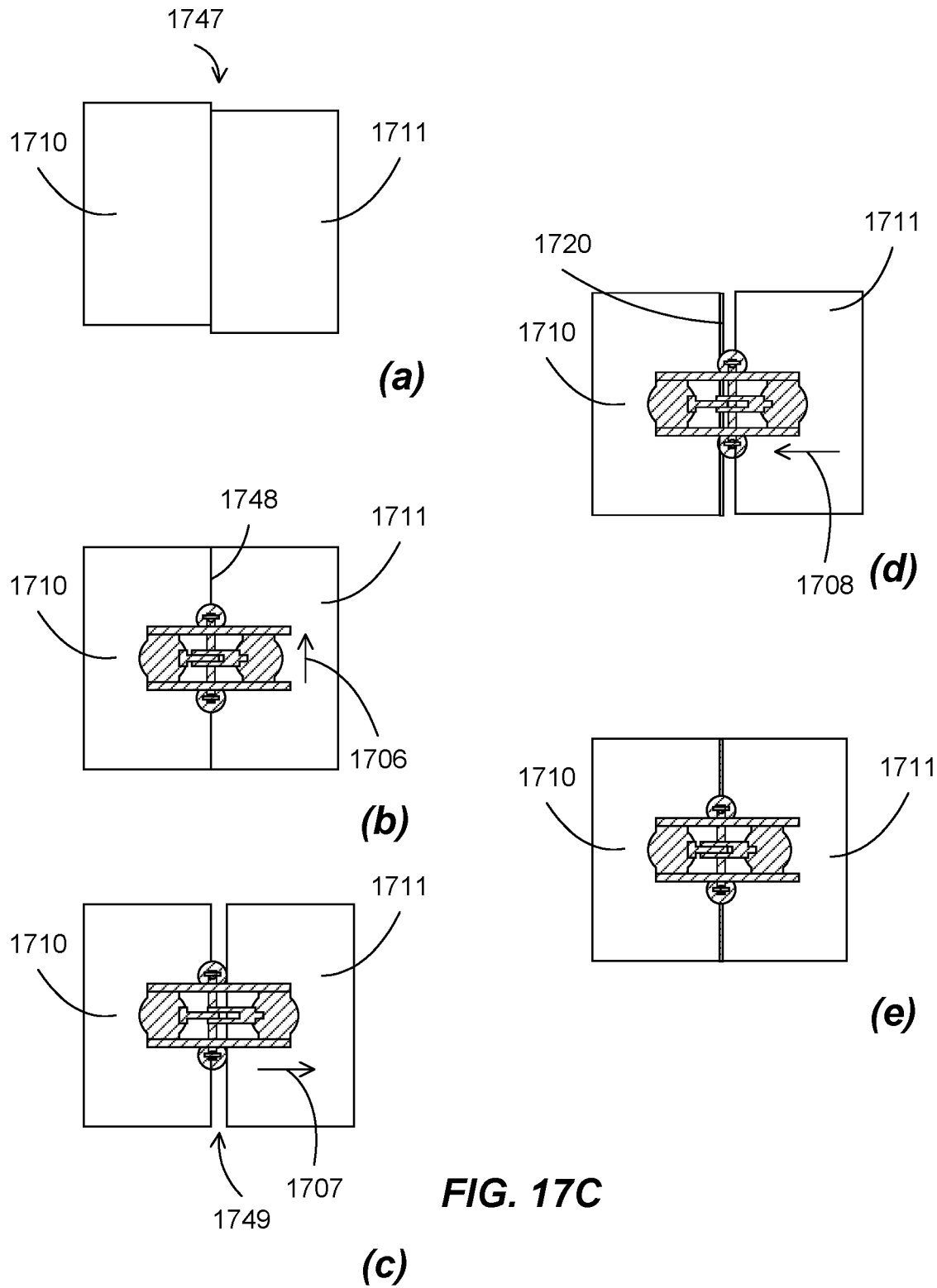

FIGS. 17A-17C illustrate processes for joining panels using a panel joiner having a minor adjustment mechanism according to some embodiments. FIGS. 17A(a)-17A(c) show a process for joining panels when the panels have a linear misalignment. An adhesive layer can be applied on the side edge surface of one or both panels.

In FIG. 17A(a), two panels 1710 and 1711 are arranged to be next to each other, with the facing side edge surfaces of two panels parallel to each other, and with the corners, e.g., the ends of the length of the side edge surfaces, aligned to each other. In practice, there can be some misalignments, such as a linear misalignment 1741, caused by the corners of the adjacent panels being offset, which can form a step, e.g., a non smooth surface, along the perpendicular side edge surfaces. The perpendicular side edge surfaces are two opposite surfaces forming a right angle with the facing side edge surface.

A panel joiner 1700 having a minor adjustment mechanism can be disposed on the panels, and the suction cup assemblies are activated to secure the panels to the suction cups. The panel joiner can be prepared for operation, including extending the suction cup assemblies, and retracting the top surface alignment feet.

The minor adjustment mechanism is then activated to eliminate the linear misalignment, by adjusting positions of the panels, such as moving the panel 1711 upward 1701 so that the corners are aligned 1742. The relative panel movement can be accomplished by moving one or both suction cups relative to the body, such as to the linear guide rods, of the panel joiner.

In FIG. 17A(b), the positions of the panels are adjusted through the minor adjustment mechanism, so that the panels are aligned, including the side edge surfaces are parallel and the corners matched. A moving mechanism of the panel joiner can be activated to retract 1702 the suction cup assemblies, thus pulling the panels toward each other.

In some embodiments, the minor adjustment can occur before the panel retraction. Alternatively, the panel retraction can occur before the minor adjustment. In another alternative, the minor adjustment and the panel retraction can be repeated, such as performing incremental minor adjustment, followed by panel retraction, and the cycle of incremental minor adjustment and panel retraction is repeated until the panels are perfectly aligned.

For example, the panels can be retracted until the two side edge surfaces are almost touching. The minor adjustment process is performed for aligning the corners. The panels then are continued to be retracted, followed by a minor adjustment to ensure that the corners are well aligned.

In FIG. 17A(c), the panels are well aligned, with the joined interface 1743 forming a highly cosmetic and seamless joint. The top surface alignment mechanism can be activated, such as lowering the alignment feet on the joined interface 1743 to align the top panel surfaces across the joined interface. After the adhesion material is set, e.g., dried, the panel joiner can be removed.

FIGS. 17B(a)-17B(c) show a process for joining panels when the panels have a rotational misalignment. A combination of linear and rotational misalignments can also be addressed by the panel joiner, using a combination of linear and rotational alignment processes. An adhesive layer can be applied on the side edge surface of one or both panels.

In FIG. 17B(a), two panels 1710 and 1711 are arranged to be next to each other, with the side edge surfaces of two panels facing each other, and with the corners, e.g., the ends of the length of the side edge surfaces, aligned to each other. In practice, there can be some misalignments, such as a rotational misalignment 1744, caused by the side edge surfaces of the panels not parallel, which can form a gap, e.g., a non continuous surface on the top surface of the panels, across the joined interface.

A panel joiner 1700 having a minor adjustment mechanism can be disposed on the panels, and the suction cup assemblies are activated to secure the panels to the suction cups. The panel joiner can be prepared for operation, including extending the suction cup assemblies, and retracting the top surface alignment feet.

The minor adjustment mechanism is then activated to eliminate the rotational misalignment 1744, by adjusting positions of the panels, such as rotating the panel 1711 in a counter clockwise direction 1703 so that the two side edge surfaces are parallel. The relative panel movement can be accomplished by rotating one or both suction cups relative to the body.

In FIG. 17B(b), the positions of the panels are adjusted through the minor adjustment mechanism, so that the panels are aligned, including the side edge surfaces are parallel and the corners matched. The minor adjustment mechanism is then activated to eliminate the linear misalignment 1745, by adjusting positions of the panels, such as moving the panel 1711 in a downward direction 1705 so that the two side edge surfaces are parallel.

A moving mechanism of the panel joiner can be activated to retract 1704 the suction cup assemblies, thus pulling the panels toward each other.

In some embodiments, the minor adjustment can occur before the panel retraction. Alternatively, the panel retraction can occur before the minor adjustment. In another alternative, the minor adjustment and the panel retraction can be repeated through small incremental steps.

In FIG. 17B(c), the panels are well aligned, with the joined interface 1746 forming a highly cosmetic and seamless joint. The top surface alignment mechanism can be activated, such as lowering the alignment feet on the joined interface 1746 to align the top panel surfaces across the joined interface. After the adhesion material is set, e.g., dried, the panel joiner can be removed.

FIGS. 17C(a)-17C(e) show a process for joining panels. In FIG. 17C(a), two panels 1710 and 1711 are arranged to be touching each other, with the side edge surfaces of two panels contacting each other, and with the corners, e.g., the ends of the length of the side edge surfaces, aligned to each other. The alignment is performed manually, for example, by a worker arranging the panels. In practice, there can be some misalignments, such as a linear misalignment 1747, caused by the corners of the adjacent panels being offset, which can form a step, e.g., a non smooth surface, along the perpendicular side edge surfaces. The misalignment can be that the side edge surfaces are not perfectly parallel, and thus, there might be a gap in between.

In FIG. 17C(b), a panel joiner having a minor adjustment mechanism can be disposed on the panels, and the suction cup assemblies are activated to secure the panels to the suction cups. The panel joiner can be prepared for operation, including retracting the suction cup assemblies, and retracting the top surface alignment feet.

The minor adjustment mechanism is then activated to eliminate the linear misalignment, by adjusting positions of the panels, such as moving the panel 1711 upward 1706 so that the corners are aligned 1748.

The panels are well aligned, with the joined interface 174 forming a highly cosmetic and seamless joint. The top surface alignment mechanism can be activated, for example, by lowering the alignment feet on the joined interface to align the top panel surfaces across the joined interface.

In FIG. 17C(c), the top surface alignment mechanism can be deactivated, for example, by raising the alignment feet from the top panel surfaces. A moving mechanism of the panel joiner can be activated to extend 1707 the suction cup assemblies, thus pulling the panels apart, away from each other to provide a gap 1749 between the panels.

In FIG. 17C(d), an adhesive layer 1720 is coated on one or both side edge surfaces of the panels. The moving mechanism of the panel joiner can be activated to retract 1708 the suction cup assemblies, thus pulling the panels toward each other, which closes the gap 1749 between the panels.

In FIG. 17C(e), minor adjustment mechanism can be reactivated to realign the side edge surfaces and the corners. The minor adjustment mechanism can also reactivated to realign the top panel surfaces across the joined interface.

After the adhesion material is set, e.g., dried, the panel joiner can be removed.

FIGS. 18A-18C illustrate flowcharts for aligning panels using a panel joiner according to some embodiments. In FIG. 18A, operation 1800 couples a compressible material around a suction cup of a panel joiner. The compressible material can include a dimension sufficient to allow the suction cup to move a distance relative to a moving mechanism of the panel joiner.

In FIG. 18B, operation 1820 moves two suction cups toward each other to narrow a gap between two panels on which the two suction cups are adhered to, while linearly and rotationally adjusting positions of at least one suction cup to align the edges of the two panels.

In FIG. 18C, operation 1840 places a panel joiner on two panels, so that a first suction cup can be adhered to a first panel and a second suction cup can be adhered to a second panel. The first panel can be disposed at a distance from the second panel. Operation 1850 activates a moving mechanism on the panel joiner to move the two suctions cups toward each other in a first direction. Operation 1860 rotates and/or moves, in a direction different from the first direction, the first panel to align the two panels.

In some embodiments, the present invention discloses panel joiner systems with rotational mechanisms for joining and aligning panels. The rotational mechanisms can assist by rotating the panels to achieve proper alignments between the panels.

The rotational mechanisms can include a bushing bearing (sometimes called a bushing), a ball bearing or a thrust bearing disposed surrounding a suction cup sub-assembly, to separate the suction cup sub-assembly from the body of the panel joiner, such as to separate the suction cup from the housing that houses the suction cup. The bearing (e.g., the bushing bearing, the ball bearing, or the thrust bearing) can have a restrictor element to restrict the rotational movement, e.g., the bearing can require a force or a torque suitable from a worker to move around the bearing, instead of freely rotatable bearing with zero or negligible force or torque to rotate the bearing.

The rotational mechanisms can allow rotational movements of the panels, in addition to the moving mechanisms and the top surface alignment mechanism. The rotational mechanisms can provide a rotational angle of less than 90 degrees, or less than 60 degrees, or less than 45 degrees, or less than 30 degrees. The rotational mechanism can assist a worker in aligning the panels, especially in aligning the panels before using the panel joiner. For example, the panels can almost be arranged in any configuration before attaching the panel joiner on the surfaces of the panels. With the rotational mechanism, the panel joiner can align the panels to achieve the perfect alignment for an invisible joint.

FIGS. 19A-19C illustrate a panel joiner having rotational mechanisms for according to some embodiments. A panel joiner 1900 can include multiple suction cup assemblies 1910A and 1910B. A suction cup assembly, such as suction cup assembly 1910C, can include a suction cup membrane 1913 for forming a vacuum adhesion to a panel 1970. The suction cup membrane can be housed in a suction body 1911. A handle 1912 can be movably coupled to the suction cup body to activate the suction cup membrane.

The panel joiner 1900 can include a moving mechanism 1920, which can be coupled to the suction cup assemblies for moving one suction cup assembly toward or away from the other suction cup assembly. A linear guide 1930, such as two smooth rods, can be coupled to the body through linear bearing assemblies to guide the body to move along a preset direction, activated by the moving mechanism 1920.

The panel joiner 1900 can include a top surface alignment mechanism 1940, which includes an alignment bar coupled to the linear guide 1930 for moving along the linear guide. The top surface alignment mechanism 1940 can also include alignment feet, which can act on the top surfaces of the panels to level the two top surfaces of the panels.

A rotational mechanism 1940 can be coupled to each suction cup assembly, forming a panel joiner having two rotational mechanisms in two suction cup assemblies, which can allow both panels to rotate independently.

The rotational mechanism can include a rolling element 1914, such as a ball bearing or a thrust bearing, which can be provided in the suction cup assembly, such as between the suction cup handle 1912 and the suction cup body 1911. The rolling element 1914 can allow the suction cup to rotate relative to the body, including to other components of the panel joiner such as the linear guide 1930. The rolling element 1914 can be disposed around the suction cup handle.

The rotational mechanism can include a limiter to limit the rotational angle of the suction cup. For example, the limiter can include a limiter plate 1916 coupled to the suction cup, such as extended from the handle 1912. The limiter plate 1916 can have an opening 1916A, which can span an angle, such as 90, 60, 45, or 30 degrees. A screw shaft 1917 can pass through the opening 1916A, to be threaded to the suction cup body 1911. The opening 1916A can be used to limit the rotational angle of the suction cup, with the screw shaft securing the angle after being tightened. The limiter can function as a restrictor, e.g., to prevent the suction cup from rotating freely, such as by loosening the screw a little to allow the suction cup to rotate but not too easily.

For example, the screw can be loosened, and the suction can be rotated relative to the suction cup body. When the screw shaft is tightened, the suction cup is fixedly coupled to the suction body, preventing the suction cup from rotating. When the screw shaft is slightly tightened, the suction cup can rotate restrictedly with respect to the suction body.

The rotational mechanism can include a ball bearing 1914B (FIG. 19B) or a thrust bearing 1914C (FIG. 19C) disposed between the suction cup handle 1912 and the suction cup body 1911.

In some embodiments, the present invention discloses a support table for supporting the panels. The support table can be used to support the panels when using a panel joiner with rotational mechanisms for joining and aligning panels.

The support table can include a flat surface portion and a roller ball portion. The support table can assist by rotating the panels to achieve proper alignments between the panels. A panel can be partially disposed on the flat surface portion, which can prevent the panel from freely moving. The other panel can be totally disposed on the roller ball surface for ease of moving.

FIGS. 20A-20B illustrate configurations and operations of a support table according to some embodiments. FIGS. 20A(a) and 20A(b) show a top view and a side view of a support table 2080 on which panels 2070 and 2071 are disposed. The support table 2080 can include a flat surface portion 2081 and a roller ball surface portion 2082. The roller ball surface portion 2082 can have multiple roller balls 2083, which are configured to assist in rolling a panel placing on the roller ball surface.

In operation, a panel 2070 can be disposed partially on the flat surface portion 2081. Another portion of the panel 2070 can be disposed on the roller ball surface 2082. Since a portion of the panel 2070 is on the flat surface, there can be friction, and thus the panel 2070 does not roll easily on the support table.

A panel 2071 can be disposed on the roller ball surface portion 2082. The panel 2071 can be disposed adjacent to the panel 2070, to allow for ease of joining. Since the panel 2071 is on the roller ball surface, the panel 2071 can roll easily on the support table.

A panel joiner 2000 can be disposed on the panels, with each suction cup assembly disposed on a panel. This configuration can allow the panel joiner 2000 to move the panel 2071 while keeping the panel 2070 substantially stationary.

FIGS. 20B(a)-20B(c) show different operations of the panel joiner. In FIG. 20B(a), the panel 2071 can rotate 2072 around a center 2073 of the suction cup assembly on the panel 2071. In FIG. 20B(b), the panel 2071 can rotate 2074 around a center 2075 of the suction cup assembly on the other panel 2070. In FIG. 20B(c), the panel 2071 can move toward 2076 or away from the other panel 2070.

FIGS. 21A-21C illustrate flowcharts for forming and operating a panel joiner according to some embodiments. In FIG. 21A, a panel joiner can include rotational elements, such as ball bearings or thrust bearings, which can be disposed around the suction cups to allow the suction cups to rotate relative to the body of the panel joiner.

Operation 2100 forms a panel joiner. The panel joiner can include two suction cups and a moving mechanism coupled to the two suction cups for moving the two suction cups relative to each other. Each suction cup can be coupled to the panel joiner through a ball bearing to allow the suction cup to rotate relative to a body of the panel joiner. The suction cup and the body are further coupled through a securable element to prevent the rotation.

In FIG. 21B, a panel joiner can include limiters to limit the rotational movements of the suction cups. Operation 2120 couples a ball bearing between each suction cup and a body of a panel joiner. The panel joiner can include a secure element to secure and limit the rotational movement of the suction cup relative to the body.

In FIG. 21C, operation 2140 disposes a first panel on a flat surface and a second on a roller ball surface. The roller ball surface can be configured to reduce friction between the second panel and the roller ball surface for ease of movement. Operation 2150 places a panel joiner on the first and second panels. Operation 2160 activates a mechanism to move the second panel toward the first panel, when rotating the second panel around rotational axes at the centers of a first suction cup and a second suction cup of the panel joiner.

FIGS. 22A-22D illustrate a sequence of movements of a panel joiner for aligning panels according to some embodiments. In FIG. 22A, a panel joiner 2200 can be disposed on two panels 2270 and 2271. The panels 2270 and 2271 can be loosely arranged, e.g., so not have been pre-aligned. Some pre-alignment can be helpful for ease of the alignment using he panel joiner, but it is not critical.

In FIG. 22B, panel 2271 can be rotated 2272 around the center of the suction cup disposed on the other panel 2270. The amount of rotation 2272 can be determined through the original arrangement of the two panels so that after another rotation 2273, the line 2274 through the corner 2280 of panel 2270 and the corner 2281 of panel 2271 is parallel to the linear guide 2231 of the panel joiner.

In FIG. 22C, panel 2271 can be rotated 2273 around the center of the suction cup disposed on the same panel 2271, until the line 2274 through the corner of panel 2270 and the corner of panel 2271 is parallel to the linear guide of the panel joiner.

In FIG. 22D, panel 2271 can move toward panel 2270 in the direction determined by the linear guide. The corner 2281 of panel 2271 also travels in the direction determined by the linear guide 2231, thus will reach the corner 2280 of panel 2270.

Alternatively, a series of incremental rotations and movements can be performed to gradually align the two panels. For example, panel 2071 can move along the linear guide to be closer to panel 2070. Panel 20271 can rotate around the centers of either or both suction cups to have a better alignment. The process can be repeated with small increments to achieve a proper alignment.

FIGS. 23A-23B illustrate flowcharts for aligning panels according to some embodiments. In FIG. 23A, operation 2300 places a panel joiner on first and second panels. A first suction cup of the panel joiner can be disposed on the first panel and a second suction cup of the panel joiner can be disposed on the second panel. Operation 2310 rotates the second panel around a center of the first suction cup. Operation 2320 rotates the second panel around a center of the second suction cup. The second rotation forms parallel edges of the first and second panels. Operation 2330 moves the second panel toward the first panel. The first and second rotations cause the top corners of the panels parallel to the movement.

In FIG. 23B, operation 2350 places a panel joiner on first and second panels. First and second suction cups of the panel joiner are disposed on the first and second panels, respectively. Operation 2360 incrementally moves the second panel toward the first panel, rotating the second panel around a center of the first suction cup, and rotating the second panel around a center of the second suction cup to align the two panels.

In some embodiments, the present invention discloses automatic mechanisms for operating a panel joiner. The vacuum formation of the suction cups and the movements of the suction cups can be performed by machinery, such as by a vacuum pump for generating the vacuum and by a motor assembly for moving the suction cups.

Figure 24:
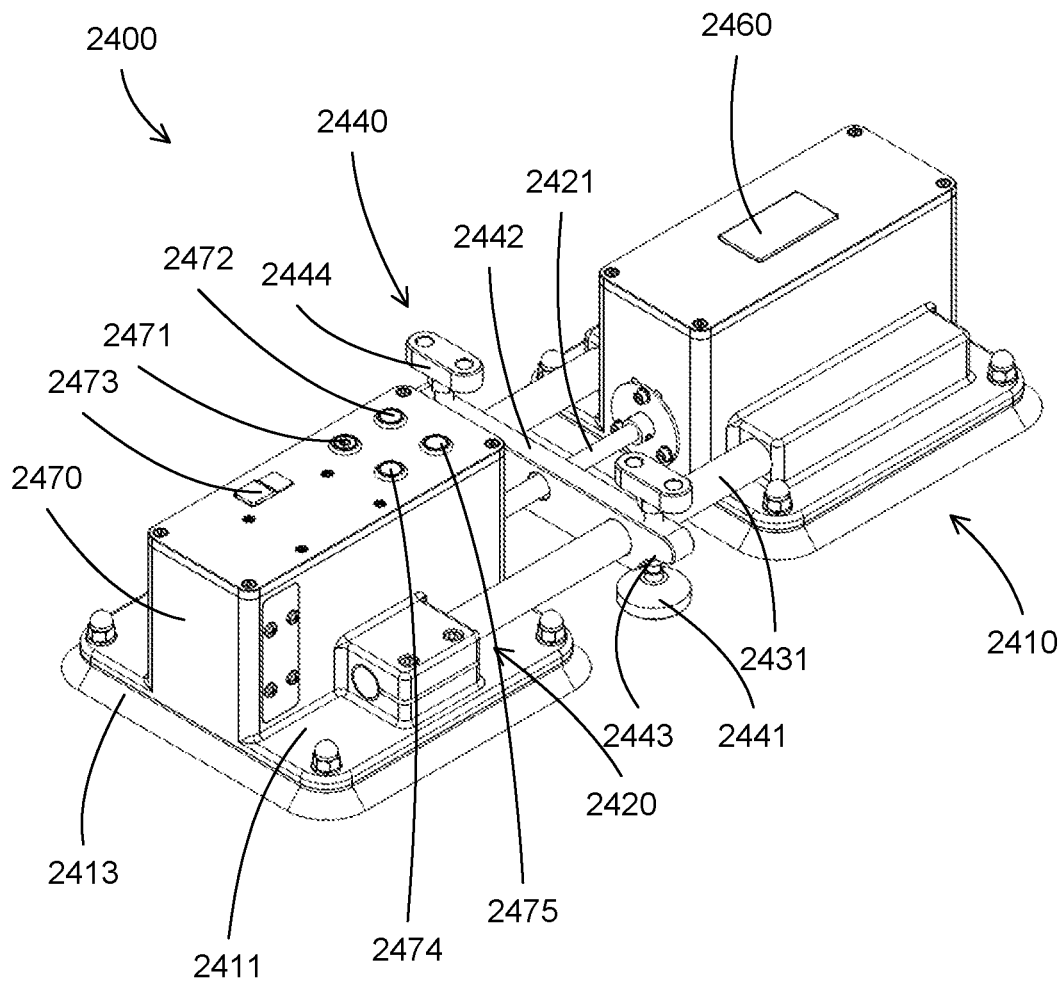
FIG. 24 illustrates a panel joiner having automatic operations according to some embodiments.

FIG. 24 illustrates a panel joiner having automatic operations according to some embodiments. A panel joiner 2400 can include two suction cup assemblies 2410, with each suction cup assembly including a flexible membrane 2413 functioning as a suction cup, which is housed in a body 2411. A vacuum pump can be disposed in a housing 2470 to generate the vacuum for the suction cup membrane 2413. A switch 2472 can be used to start or stop the vacuum pump. A release button 2473 can be used to release the vacuum in the suction cups. Power for the vacuum pump can include a battery, which can be disposed in a housing 2460. On-off switch 2471 can be provided on housing 2470 for supplying power to the vacuum pump and other motors.

The two suction cup assemblies 2410 can be coupled together through a moving mechanism 2420. In this configuration, the moving mechanism 2420 can include a threaded rod 2421, with one end of the threaded rod 2421 coupled to a suction cup assemblies for moving the suction cup assemblies toward or away from each other. A motor disposed in the housing 2470 can be used to operate the moving mechanism 2420, for example, through forward and reverse buttons 2474 and 2475.

The moving mechanism 2420 can include a linear guide in the form of two smooth rods 2431, which can function as directional guidance for the movements of the suction cup assemblies. The suction cup assemblies can be coupled to the smooth rods 2431 through linear bearings, to allow the suction cup assemblies to easily move along the smooth rods.

The panel joiner 2400 can include a top surface alignment mechanism 2440, which can push on the top surfaces of both panels at the joined interface to align the two top surfaces. The mechanism 2440 can include an alignment bar 2442, which can be coupled to the linear guide 2431 to move along the linear guide between the two suction cup assemblies.

At the ends of the alignment bar 2442, there can be two alignment feet assemblies, with each alignment feet assembly including a foot 2441, which is coupled to a threaded rod 2443, which is coupled to a handle 2444. The threaded rod is threaded to the alignment bar 2442, so that when the handle rotates, the threaded rod rotates against the alignment bar, and pushing to or pulling the foot away from the top surfaces of the panels.

Other motors can be included, for example, to rotate the suction cup assemblies.

What is claimed is:

1. A panel joiner for joining two panels, the panel joiner comprising
two sets of suction cups,
    wherein the suction cups are configured to be coupled to top surfaces of the two panels by vacuum suction;
a linear guide,
    wherein the two sets of suction cups are coupled to the linear guide,
    wherein at least a set of suction cups is configured to be movable along a direction of the linear guide,
    wherein each set of the sets of suction cups is coupled to the linear guide through a bearing assembly configured to allow the each set of the sets of suction cups to be rotatable along an axis of rotation perpendicular to the surfaces of the two panels relative to the linear guide;
a restrictor comprising a limiter plate and a shaft coupled to each set of the two sets of suction cups to generate configurations in which friction to rotational movements of said each set of the two sets of suction cups relative to the linear guide is varied and rotational angle of said each set of the two sets of suction cups is limited;
a moving mechanism,
  wherein the moving mechanism is coupled to the two sets of suction cups,
  wherein the moving mechanism is configured to convert a rotational movement to a linear movement,
  wherein the moving mechanism is configured to move the at least a set of suction cups along the linear guide;
a surface alignment module,
  wherein the surface alignment module is configured to align surfaces of the two panels to minimize a step between the top surfaces of the two panels,
  wherein the surface alignment module is movably coupled to the linear guide to move along the linear guide,
  wherein the surface alignment module comprises one or more flat elements configured to align the top surfaces,
  wherein the one or more flat elements is movable along a direction perpendicular to the top surfaces,
  wherein the one or more flat elements comprise a flat bottom surface for pressing on the top surfaces at one or more joint locations between the two panels.

2. The panel joiner as in claim 1,
wherein each set of suction cups comprises one suction cup,
wherein the linear guide comprises two parallel guides,
wherein the one suction cup is coupled to the two parallel guides at two opposite sides of the one suction cup.

3. The panel joiner as in claim 1,
wherein the moving mechanism comprises a lead screw or a ball screw for moving the at least a set of suction cups toward or away from the other set of suction cups.

4. The panel joiner as in claim 1,
wherein the moving mechanism comprises a turnbuckle for moving the at least a set of suction cups toward or away from the other set of suction cups.

5. The panel joiner as in claim 1, further comprising
wherein the surface alignment module comprises one or more connector elements movably coupled to the linear guide for moving along the direction of the linear guide,
wherein each connector element of the one or more connector elements comprises at least one flat element of the one or more flat elements, with the at least one flat element configured to move along the direction perpendicular to the top surfaces,
wherein the surface alignment module further comprises a locking element to secure the one or more connector elements to the linear guide.

6. The panel joiner as in claim 1,
wherein a set of suction cups of the two sets of suction cups is coupled to the linear guide through a compressible material,
wherein the compressible material is configured to provide displacement movements of a panel coupled to the set of suction cups.

7. The panel joiner as in claim 1,
wherein each set of suction cups is coupled to the linear guide through a bearing configured to allow the each set of suction cups to rotate along an axis of rotation perpendicular to the top surfaces of the two panels,
wherein the bearing comprises one of a bushing bearing, a ball bearing, or a thrust bearing.

8. The panel joiner as in claim 1, further comprising
a vacuum pump coupled to the suction cups, wherein the vacuum pump is configured to generate suction for the sets of suction cups,
a motor coupled to the moving mechanism, wherein the motor is configured to move the at least a set of suction cups toward or away from the other set of suction cups.

9. A panel joiner system for joining two panels, the panel joiner system comprising
a support table configured to support the two panels,
  wherein the support table comprises a flat surface portion and a roller ball surface portion,
  wherein a first panel of the two panels is configured to be partially disposed on the flat surface portion,
  wherein a second panel of the two panels is configured to be disposed on the roller ball portion;
two suction cups,
  wherein each of the two suction cups comprises a suction cup handle,
  wherein the two suction cups are configured to be coupled to top surfaces of the two panels by vacuum suction;
a linear guide coupled to the two suction cups,
  wherein the linear guide comprises two parallel guides,
  wherein the two suction cup are coupled to the two parallel guides at two facing sides of the two suction cups,
  wherein at least a suction cup is movably coupled to the linear guide,
  wherein the at least a suction cup is configured to be movable along a direction of the linear guide,
  wherein each suction cup is coupled to the two parallel guides through a bearing configured to allow the each suction cup to be rotatable along an axis of rotation perpendicular to the top surfaces of the two panels relative to the two parallel guides,
  wherein the bearing is disposed around the suction cup handle,
  wherein the bearing comprises one of a bushing bearing, a ball bearing, or a thrust bearing;
a restrictor comprising a limiter plate and a shaft coupled to each of the two suction cups to generate configurations in which friction to rotational movements of said each of the two suction cups relative to the linear guide is varied and rotational angle of said each of the two suction cups is limited;
a moving mechanism,
  wherein the moving mechanism is configured to move the at least a set of suction cups along the linear guide;
a surface alignment module,
  wherein the surface alignment module comprises a connector element,
  wherein the connector element is movably coupled to the two parallel guides to move along the two parallel guides,
  wherein the surface alignment module comprises one or more flat elements coupled to the connector element,
  wherein the one or more flat elements are configured to be movable along a direction perpendicular to the top surfaces for pressing on the top surfaces at one or more joint locations between the two panels,
  wherein the surface alignment module comprises a locking element to secure the connector element to the two parallel guides.

10. The panel joiner system as in claim 9,
wherein a bearing is coupled between a support coupled to a flexible membrane of a suction cup of the two suction cups and a support coupled to the linear guide to allow the flexible membrane to rotate relative to the linear guide.

11. The panel joiner system as in claim 9, further comprising
a limiter coupled between each of the two suction cups and the linear guide to limit rotational movements of said each of the two suction cups relative to the linear guide.

12. The panel joiner system as in claim 9, further comprising
a securing element coupled between each of the two suction cups and the linear guide to generate a configuration in which rotational movements of said each of the two suction cups relative to the linear guide is prevented.

13. The panel joiner system as in claim 9,
wherein the moving mechanism comprises a lead screw or a ball screw for moving one of the suction cups toward or away from the other of the suction cups.

14. The panel joiner system as in claim 9, further comprising
a vacuum pump coupled to each of the two suction cups wherein the vacuum pump is configured to generate suction for said each of the two suction cups,
a motor coupled to the moving mechanism, wherein the motor is configured to move said each of the two suction cups toward or away from the other of the two suction cups.

15. A panel joiner for joining two panels, the panel joiner comprising
two suction cups,
wherein the two suction cups are configured to be coupled to top surfaces of the two panels by vacuum suction;
a linear guide coupled to the two suction cups,
wherein the linear guide comprises two parallel guides,
wherein the two suction cup are coupled to the two parallel guides at two facing sides of the two suction cups,
wherein at least a suction cup is movably coupled to the two parallel guides,
wherein the at least a suction cup is configured to be movable along a direction of the two parallel guides,
wherein each suction cup of the two suction cups is coupled to the two parallel guides through a bearing configured to allow the each suction cup to be rotatable along an axis of rotation perpendicular to the top surfaces of the two panels relative to the two parallel guides;
a restrictor comprising a limiter plate and a shaft coupled to each of the two suction cups to generate configurations in which friction to rotational movements of each of the two suction cups relative to the linear guide is varied and rotational angle of said each of the two suction cups is limited;
a moving mechanism,
wherein the moving mechanism is configured to move the at least a suction cup along the two parallel guides:
a surface alignment module,
wherein the surface alignment module is movably coupled to the two parallel guides to move along the two parallel guides,
wherein the surface alignment module comprises one or more flat elements configured to be movable along a direction perpendicular to the top surfaces for pressing on the top surfaces at one or more joint locations between the two panels.

16. The panel joiner as in claim 15,
wherein the moving mechanism comprises a lead screw or a ball screw for moving said each of the two suction cups toward or away from the other of the two suction cups.

17. The panel joiner as in claim 15, further comprising
wherein the surface alignment module comprises one or more connector elements movably coupled to the linear guide for moving along the direction of the linear guide,
wherein each connector element of the one or more connector elements comprises at least one flat element of the one or more flat elements, with the at least one flat element configured to move along the direction perpendicular to the top surfaces,
wherein the surface alignment module further comprises a locking element to secure the one or more connector elements to the linear guide.

18. The panel joiner as in claim 15,
wherein the bearing comprises one of a bushing bearing, a ball bearing, or a thrust bearing.

19. The panel joiner as in claim 15, further comprising
a vacuum pump coupled to each of the two suction cups,
wherein the vacuum pump is configured to generate suction for said each of the two suction cups,
a motor coupled to the moving mechanism, wherein the motor is configured to move said each of the two suction cups toward or away from the other of the two suction cups.

* * * * *